(12) United States Patent
Enomoto et al.

(10) Patent No.: US 11,616,406 B2
(45) Date of Patent: Mar. 28, 2023

(54) WIRELESS POWER FEEDING SYSTEM, POWER RECEPTION APPARATUS, POWER TRANSMISSION APPARATUS, METHOD FOR CONTROLLING WIRELESS POWER FEEDING SYSTEM, AND NON-TRANSITORY COMPUTER-READABLE STORAGE MEDIUM

(71) Applicant: Asahi Kasei Microdevices Corporation, Tokyo (JP)

(72) Inventors: Hiroaki Enomoto, Tokyo (JP); Shiro Taga, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 150 days.

(21) Appl. No.: 17/177,248

(22) Filed: Feb. 17, 2021

(65) Prior Publication Data

US 2021/0257865 A1 Aug. 19, 2021

(30) Foreign Application Priority Data

Feb. 18, 2020 (JP) .............................. JP2020-025621

(51) Int. Cl.
*H02J 50/80* (2016.01)
*H02J 50/70* (2016.01)

(52) U.S. Cl.
CPC .............. *H02J 50/80* (2016.02); *H02J 50/70* (2016.02)

(58) Field of Classification Search
CPC .................................. H02J 50/80; H02J 50/70

USPC ......................................................... 307/104
See application file for complete search history.

(56) References Cited

U.S. PATENT DOCUMENTS

| | | |
|---|---|---|
| 2006/0108986 A1 | 5/2006 | Funabashi |
| 2013/0181539 A1 | 7/2013 | Muratov |
| 2013/0342024 A1 | 12/2013 | Byun |
| 2014/0015330 A1 | 1/2014 | Byun |
| 2015/0200549 A1 | 7/2015 | Michisaka |
| 2016/0094050 A1 | 3/2016 | Shichino |
| 2016/0156216 A1 | 6/2016 | Nakao |
| 2017/0077753 A1 | 3/2017 | Ting |
| 2017/0366034 A1 | 12/2017 | Matsui |
| 2022/0181918 A1* | 6/2022 | Hiramatsu .............. H02J 50/80 |

\* cited by examiner

*Primary Examiner* — Michael R. Fin

(57) ABSTRACT

A wireless power feeding system is provided, comprising a power transmission apparatus configured to transmit predetermined transmission power and a power reception apparatus configured to receive the transmission power and generate input voltage according to the transmission power, wherein the power transmission apparatus includes a power transmission control unit configured to control an amount of the transmission power, the power transmission control unit is configured to receive a modulation signal from the power reception apparatus, and to reduce the transmission power in a case where the modulation signal is not received for a predetermined period after receiving the previous modulation signal, and the power transmission apparatus and the power reception apparatus are configured to control the input voltage to be larger than a predetermined first threshold and below a second threshold which is larger than the first threshold.

17 Claims, 23 Drawing Sheets

WIRELESS POWER FEEDING SYSTEM, POWER RECEPTION APPARATUS, POWER TRANSMISSION APPARATUS, METHOD FOR CONTROLLING WIRELESS POWER FEEDING SYSTEM, AND NON-TRANSITORY COMPUTER-READABLE STORAGE MEDIUM

The contents of the following Japanese patent application is incorporated herein by reference:

NO. 2020-025621 filed in JP on Feb. 18, 2020.

BACKGROUND

1. Technical Field

The present invention relates to a wireless power feeding system, a power reception apparatus, a power transmission apparatus, a method for controlling the wireless power feeding system, and a non-transitory computer-readable storage medium.

2. Related Art

Traditionally, a wireless power feeding system for transmitting power from a power transmission apparatus to a power reception apparatus using microwave power transmission technology is known (see Patent document 1, for example).

Patent document 1: International Publication No. 2016/147312

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through the embodiments of the invention. However, the embodiments described below are not to limit the claimed invention. Moreover, not all combinations of features described in the embodiments are essential to solutions of the invention.

Figure 1A:
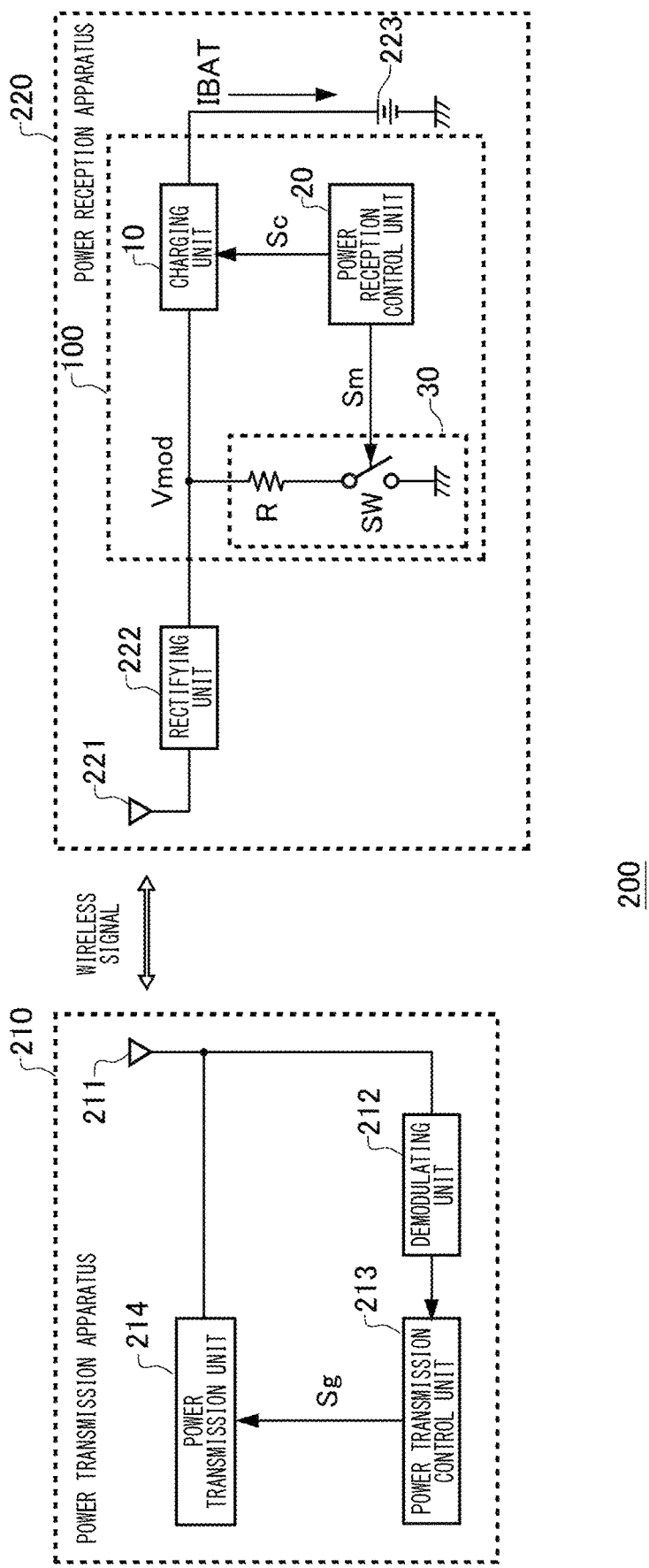
FIG. 1A illustrates an example of a configuration of a power feeding system 200.

FIG. 1A illustrates an example of a configuration of a power feeding system 200. The power feeding system 200 includes a power transmission apparatus 210 and a power reception apparatus 220.

The power feeding system 200 is a wireless power feeding device configured to charge a power storage unit 223 by sending and receiving wireless signals between the power transmission apparatus 210 and the power reception apparatus 220. In addition, the power feeding system 200 implements sending and receiving of information between the power transmission apparatus 210 and the power reception apparatus 220 through load modulation communication. For example, the power feeding system 200 is a microwave power transmission system using enclosure resonance technology.

The power transmission apparatus 210 transmits predetermined transmission power by sending a wireless signal for wireless power feeding to the power reception apparatus 220. The power transmission apparatus 210 includes an antenna 211, a demodulating unit 212, a power transmission control unit 213, and a transmission unit 214.

The antenna 211 sends and receives the wireless signal with the power reception apparatus 220. The demodulating unit 212 demodulates the modulation signal modulated by the power reception apparatus 220.

The power transmission control unit 213 controls the amount of the transmission power to be sent from the power transmission apparatus 210 to the power reception apparatus 220. For example, the power transmission control unit 213 controls the amount of the transmission power based on data demodulated by the demodulating unit 212. The power transmission control unit 213 of the present example inputs a gain control signal Sg to the transmission unit 214 to control the transmission power to be transmitted by the power transmission apparatus 210.

The transmission unit 214 converts the current supplied from the power source into an electromagnetic wave of the predetermined transmission power, to transmit it from the antenna 211 to the power reception apparatus 220. The transmission unit 214 of the present example controls transmission power by adjusting the gain according to the gain control signal Sg.

The power reception apparatus 220 receives the electromagnetic wave and performs charging with an input voltage Vmod according to the transmission power. The power reception apparatus 220 includes a charging apparatus 100, an antenna 221, a rectifying unit 222, and a power storage unit 223.

The rectifying unit 222 converts the electromagnetic wave received by the antenna 221 into direct current. The rectifying unit 222 of the present example converts the electromagnetic wave into direct current with an input voltage Vmod.

The charging apparatus 100 charges the power storage unit 223 with a charging current IBAT. The charging apparatus 100 of the present example can control the amount of the charging current IBAT. The charging apparatus 100 includes a charging unit 10, a power reception control unit 20, and a load modulating unit 30.

The charging unit 10 charges the power storage unit 223 with the charging current IBAT. For example, the charging unit 10 is a charger such as a DC-DC conversion circuit. The charging unit 10 is provided between the rectifying unit 222 and the power storage unit 223.

The power reception control unit 20 sends a charging current control signal Sc to the charging unit 10 to control the amount of the charging current IBAT. In addition, the power reception control unit 20 sends a modulation control signal Sm to the load modulating unit 30 to control modulation of the load modulating unit 30. For example, the power reception control unit 20 controls the amount of the charging current IBAT according to the value of the charging current IBAT and the input voltage Vmod.

The load modulating unit 30 implements load modulation communication from the power reception apparatus 220 to the power transmission apparatus 210 by modulating the impedance (i.e. load). The load modulating unit 30 of the present example has a switch SW and a resistor R that are connected in series. The load modulating unit 30 changes the impedance switching the on and off of the switch SW. For example, information on the charging current IBAT, the input voltage Vmod, the battery voltage of the power storage unit 223, and the temperature of the power storage unit 223 or the like is sent via load modulation communication.

The power storage unit 223 is wirelessly fed by the power feeding system 200. Although the power storage unit 223 is provided inside the power reception apparatus 220, it may be provided outside the power reception apparatus 220. For example, the power storage unit 223 is a storage battery such as a Li-ion battery. Electrical power required per unit time for charging is determined by multiplying the battery voltage by the charging current IBAT. Therefore, when the battery voltage of the power storage unit 223 rises as the constant current charging proceeds, the electrical power required per unit time rises.

The power transmission apparatus 210 and the power reception apparatus 220 are coupled by electromagnetic wave via the antenna they each have. For example, the power transmission apparatus 210 and the power reception apparatus 220 sends and receives signals through microwave. The power transmission apparatus 210 supplies, as its signal source, limited electrical power to the power reception apparatus 220 with limited impedance. The electrical power received at the power reception apparatus 220 changes depending on the impedance of the power reception apparatus 220, and the electrical power of the power reception apparatus 220 is maximized (i.e. maximum transmission efficiency) when the impedances of the power transmission apparatus 210 and the power reception apparatus 220 are equal.

In load modulation communication, various charging information such as information on the charging status, power transmission insufficiency or power transmission excess to the power reception apparatus 220, or an alarm from the power reception apparatus 220 can be sent and received. Note that, the power transmission apparatus 210 may have a load modulating unit to send various commands to the power reception apparatus 220.

Note that, although a case in which the power transmission apparatus 210 feeds power to the single power reception apparatus 220 is illustrated in the present example, the power transmission apparatus 210 may send wireless signals to each of a plurality of power reception apparatuses 220. The power transmission apparatus 210 may communicate with a plurality of power reception apparatuses 220 via load modulation communication, while supplying electrical power to a plurality of power reception apparatuses 220 with the wireless signals. In addition, when load modulation is applied by either of the power transmission apparatus 210 or the plurality of power reception apparatuses 220, load modulation signal may propagate to the power transmission apparatus 210 and all of the power reception apparatuses 220.

Figure 1B:
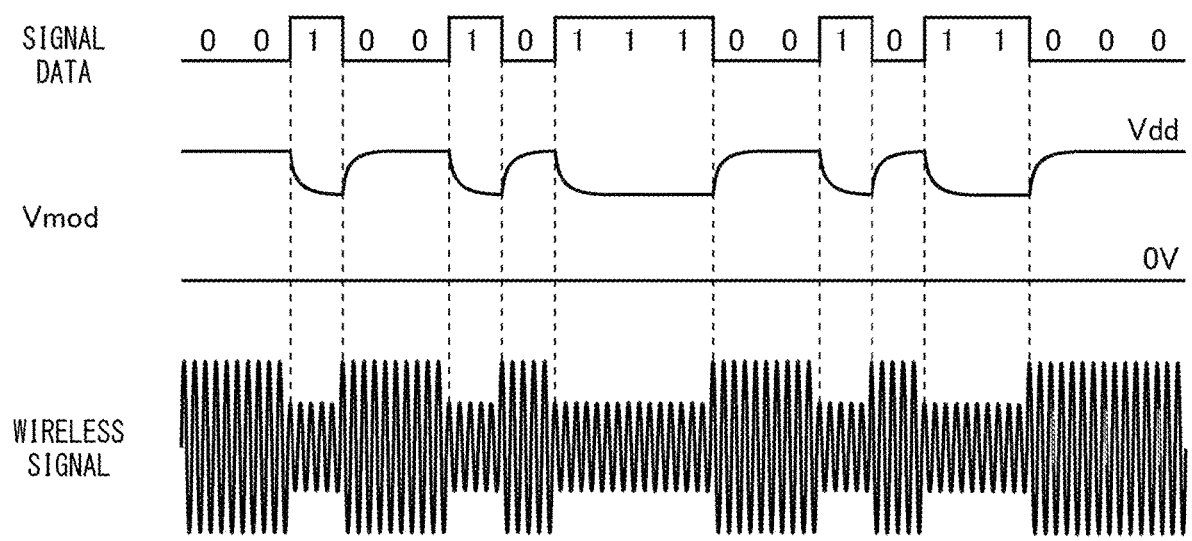
FIG. 1B describes a wireless signal transmitted by the power feeding system 200.

FIG. 1B describes a wireless signal transmitted by the power feeding system 200. The power feeding system 200 of the present example implements communication between the power transmission apparatus 210 and the power reception apparatus 220 through load modulation.

Signal data is input to the load modulating unit 30 and the switch SW of the load modulating unit 30 is turned on and off. For example, the switch SW is turned off when the signal data is "0", and the switch SW is turned on when the signal data is "1". The switch SW turning on and off causes the impedance of the input of the power reception apparatus 220 to change.

The input voltage Vmod is AM-modulated according to the change in the impedance of the input of the power reception apparatus 220. For example, the input voltage Vmod falls from a power source voltage VDD by turning the switch SW on, and returns to the power source voltage VDD by turning the switch SW off.

The wireless signal includes information on the input voltage Vmod which has been AM-modulated. In this manner, AM-modulated information is transmitted to the wireless signal, thereby enabling the power transmission apparatus 210 and the power reception apparatus 220 to send and receive charging information. The power transmission apparatus 210 can control the operation of the power transmission apparatus 210 according to the charging progress status of the power storage unit 223, by sending and receiving charging information with the power reception apparatus 220.

Figure 1C:
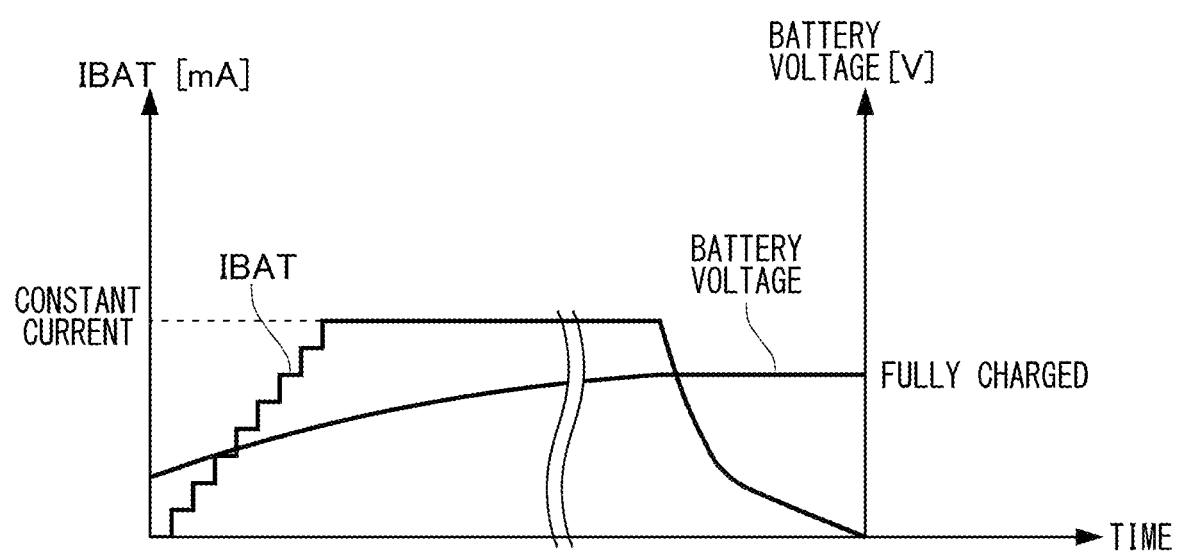
FIG. 1C illustrates an example of a charging profile of a power storage unit 223.

FIG. 1C illustrates an example of a charging profile of a power storage unit 223. The vertical axis indicates the charging current IBAT [mA] and the battery voltage [V], and the horizontal axis indicates any time. The charging apparatus 100 increases the charging current IBAT in a step-wise manner by means of constant current charging from the start of the charging up to near full charge. For example, taking the battery life into consideration, 80% of the charging of the power storage unit 223 is performed by constant current charging and the remaining 20% is performed by constant voltage charging.

Note that, the larger the charging current IBAT, the faster the charging becomes, but there is a risk of shortening of battery life if excess charging current IBAT relative to the battery capacity is supplied. Therefore, the optimum value of the charging current IBAT varies according to the battery capacity.

Figure 1D:
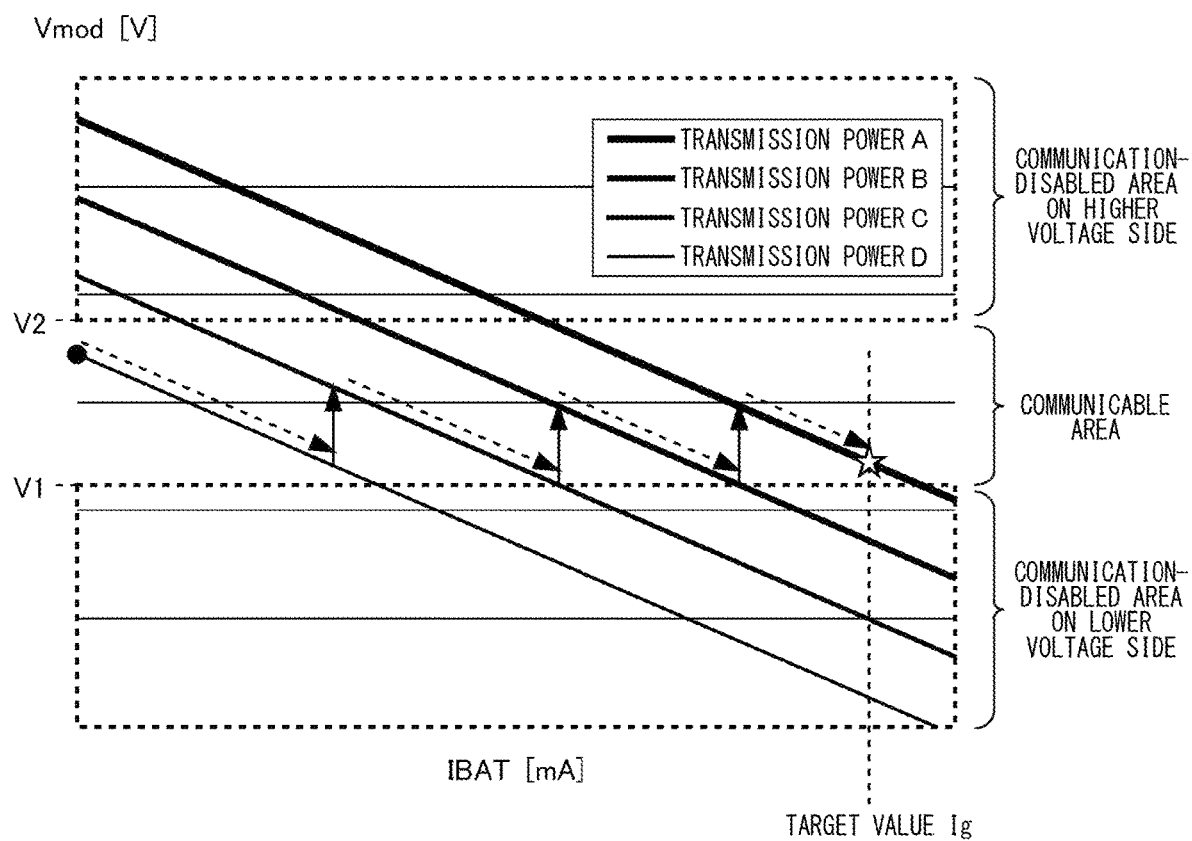
FIG. 1D illustrates an example of an ideal method for controlling a charging current IBAT and input voltage Vmod.

FIG. 1D illustrates an example of an ideal method for controlling a charging current IBAT and input voltage Vmod. The vertical axis indicates the input voltage Vmod [V] and the horizontal axis indicates the charging current IBAT [mA]. The charging current IBAT and the input voltage Vmod have a linear relationship. The four parallel lines each correspond to cases where the transmission power is changed to transmission power A to transmission power D. The transmission power A to transmission power D are in order from higher electrical power.

The communicable area indicates the range of the input voltage Vmod in which the power transmission apparatus 210 and the power reception apparatus 220 are able to communicate via load modulation. The communicable area is a range that is larger than the first threshold V1 and below the second threshold V2.

The communication-disabled area includes a communication-disabled area on a higher voltage side than the communicable area and a communication-disabled area on a lower voltage side than the communicable area. That is, there are areas where communication via load modulation is disabled in both of a case in which transmission power is insufficient and a case in which transmission power is excess.

The communication-disabled area on the higher voltage side is an area in which communication is disabled because of abnormal heat generation due to excess transmission power to the power reception apparatus 220. In a case where the transmission power is excess, consumption of power at the rectifying unit 222 may become too large and abnormal heat generation may occur. In particular, in a case where the power reception apparatus 220 is a small type, it is easily heated to a high temperature due to poor heat dissipation. In addition, in a case where the rectifying unit 222 has a diode rectifier, reverse current of the diode flows when the input voltage Vmod becomes too high. When excess current flows to the diode, it may become impossible to perform the modulation.

The communication-disabled area on the lower voltage side is an area in which load modulation communication cannot be performed due to insufficient transmission power to the power reception apparatus 220. When the transmission power is insufficient, the input voltage Vmod becomes close to the battery voltage, which causes the operation point of the charger to collapse, thereby disabling the modulation.

The first threshold V1 may be a fixed value or may be a variable value. In one example, in a case where the first threshold V1 is a fixed value, in order to achieve load modulation communication, the first threshold V1 is set higher than a fully charged battery voltage. For example, if a fully charged battery voltage of the power storage unit 223 is 4.2 V, the first threshold V1 may be set at 4.35 V, allowing for a margin of 0.15 V.

In a case where the first threshold V1 is a variable value, it may be varied according to the battery voltage. In this manner, at the initial steps of charging, charging by unnecessarily large input voltage Vmod relative to the battery voltage can be prevented. In particular, when charging with a linear charging method, it is effective in restricting excess consumption.

The second threshold V2 may be a fixed value or may be a variable value. In a case where the second threshold V2 is a fixed value, it is determined according to the assumed characteristics of the power reception apparatus 220. For example, the second threshold V2 is determined according to the reverse breakdown voltage of the diode of the rectifying unit 222. In addition, in a case where the second threshold V2 is a variable value, it may be varied according to the characteristics of the rectifying unit 222 of the registered power reception apparatus 220.

The power feeding system 200 sets the charging current IBAT to an appropriate target value Ig. The target value Ig of the present example corresponds to the transmission power A, and is indicated with a star. The charging current IBAT may be set to the transmission power A in order to obtain the target value Ig, but with the charger circuit directly after activation at the beginning of power feeding, the charging current IBAT=0, which will lead to entering the communication-disabled area on the higher voltage side. Therefore, the power feeding system 200 starts from a smaller transmission power D at the beginning of power feeding, and gradually brings the charging current IBAT closer to the target value Ig.

At the transmission power D, when the charging current IBAT is increased, the input voltage Vmod falls. Then, when the charging current IBAT is increased to the transmission power C to increase the charging current IBAT at the transmission power C, the input voltage Vmod falls. Similarly, when the charging current IBAT is increased to the transmission power B to increase the charging current IBAT at the transmission power B, the input voltage Vmod falls. Moreover, the charging current IBAT is increased to the transmission power A to increase the charging current IBAT to the target value Ig at the transmission power A.

The power feeding system 200 of the present example can set the charging current IBAT to the target value Ig, while maintaining the input voltage Vmod in the communicable area. Therefore, the power feeding system 200 can implement appropriate transmission power control by stable load modulation communication, even in a case where the number of power reception apparatuses 220 is unknown, or a case where the positional relationship of the power transmission apparatus 210 and the power reception apparatus 220 is unknown.

Figure 2A:
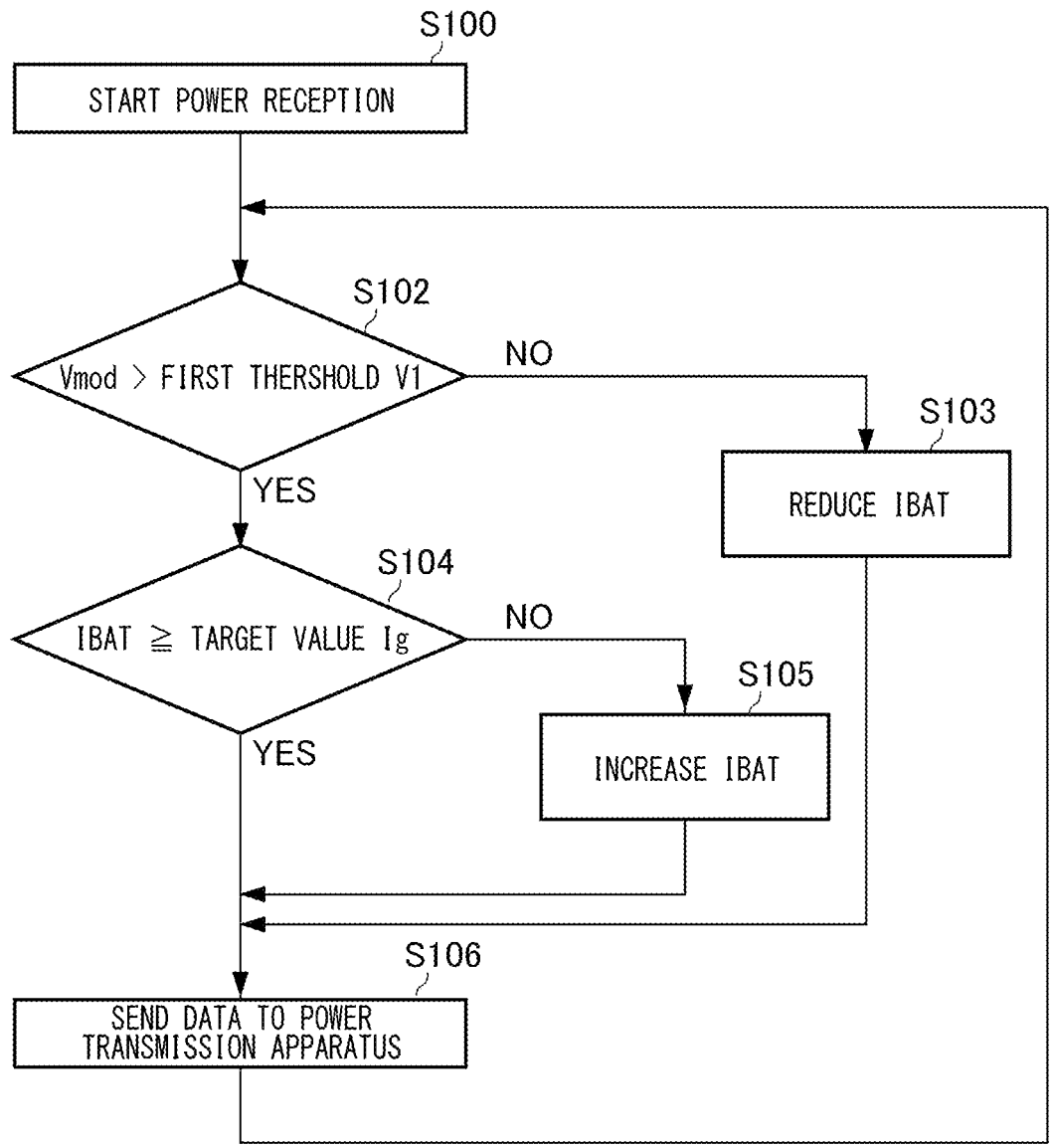
FIG. 2A illustrates an example of an operation flowchart of a power reception apparatus 220 according to a first embodiment.

FIG. 2A illustrates an example of an operation flowchart of a power reception apparatus 220 according to a first embodiment. At step S100, power reception by the power reception apparatus 220 starts.

At step S102, it is determined whether input voltage Vmod>first threshold V1 is met. If input voltage Vmod>first threshold V1 is met, the process proceeds to step S104. If input voltage Vmod>first threshold V1 is not met, the charging current IBAT is reduced (step S103). That is, the charging current IBAT is reduced in a case where the input voltage Vmod is equal to or smaller than the first threshold V1.

At step S104, it is determined whether charging current IBAT≥target value Ig is met. If charging current IBAT≥target value Ig is met, the process proceeds to step S106. If charging current IBAT≥target value Ig is not met, the charging current IBAT is increased (step S105). That is, the charging current IBAT is increased in a case where the input voltage Vmod is larger than the first threshold V1 and where the charging current IBAT is below the target value Ig.

At step S106, the power reception apparatus 220 sends the data to the power transmission apparatus 210. In this manner, the power reception apparatus 220 sends the data to the power transmission apparatus 210 at a predetermined communication period, regardless of whether the charging current IBAT is controlled. Subsequently, the process may return to step S102, and the input voltage Vmod and the first threshold V1 may be compared. Note that, the control may end when the charging current IBAT reaches the target value Ig.

Figure 2B:
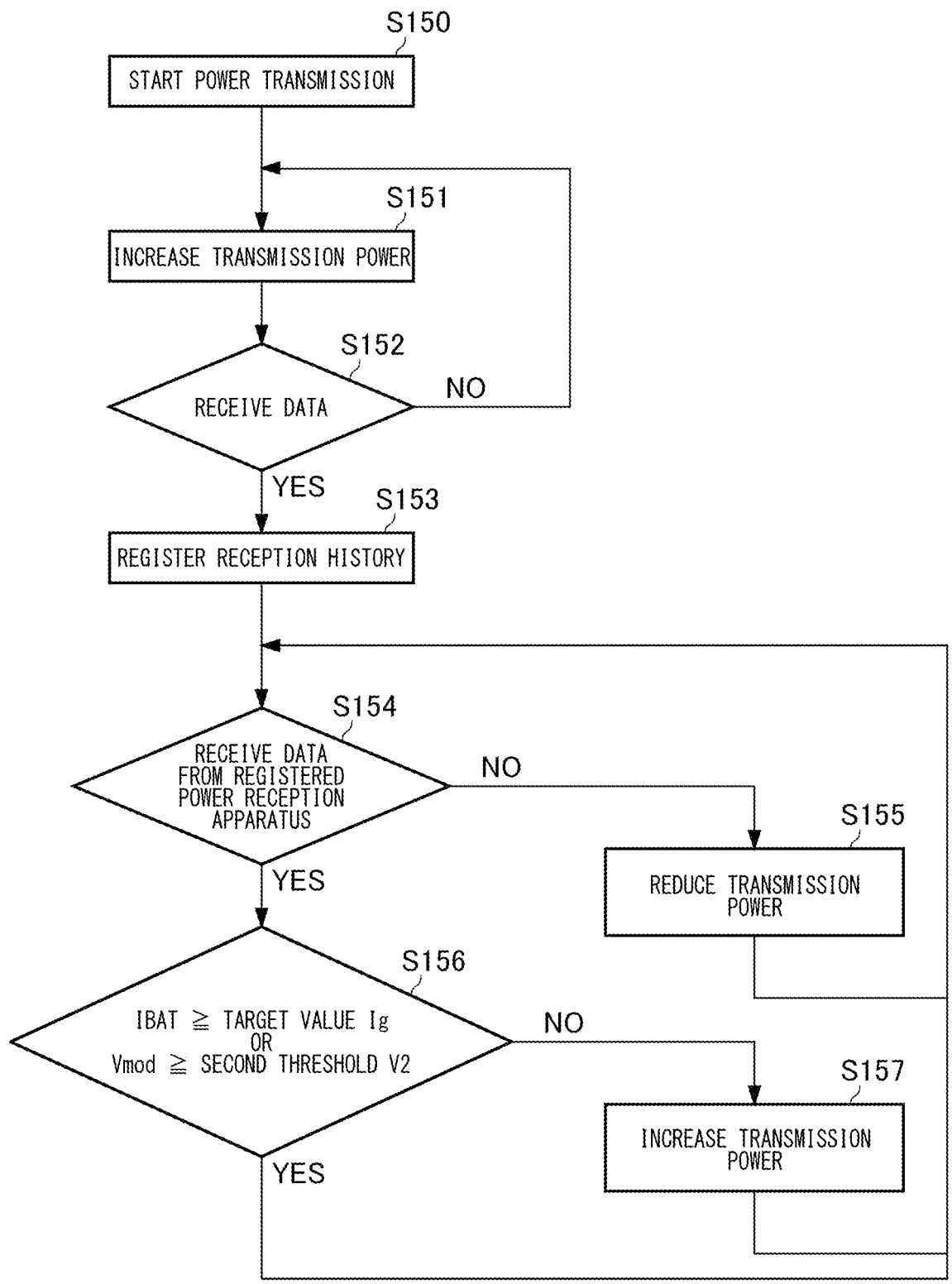
FIG. 2B illustrates an example of an operation flowchart of a power transmission apparatus 210 according to the first embodiment.

FIG. 2B illustrates an example of an operation flowchart of a power transmission apparatus 210 according to the first embodiment. At step S150, power transmission by the power transmission apparatus 210 starts.

At step S151, the transmission power is increased. At step S152, it is determined whether data has been received from the power reception apparatus 220 via load modulation communication by the power transmission apparatus 210. If the data is received, reception history is registered (step S153). If the data is not received, the process returns to step S151 and the transmission power is increased.

At step S154, it is determined whether the data has been received from the power reception apparatus 220 of which the reception history has been registered at step S153.

If the data is received from the power reception apparatus 220, the process proceeds to S156. If the data is not received from the registered power reception apparatus 220, the transmission power is reduced (step S155).

At step S156, it is determined whether charging current IBAT≥target value Ig or input voltage Vmod≥second threshold V2 is met. If charging current IBAT≥target value Ig or input voltage Vmod≥second threshold V2 is met, the process returns to step S154. If charging current IBAT≥target value Ig or input voltage Vmod≥second threshold V2 is not met, the transmission power is increased (step S157). That is, the power transmission control unit 213 increases the transmission power in a case where the data is received from the power reception apparatus 220, and where the charging current IBAT is smaller than the target value Ig and the input voltage Vmod is below the second threshold V2. In this manner, the charging current IBAT is brought closer to the target value Ig.

The power feeding system 200 operates by controlling each of the power transmission apparatus 210 and the power reception apparatus 220 following the operation flowchart in FIGS. 2A and 2B. For example, after starting power transmission at step S150, the power transmission apparatus 210 increases the transmission power until communication from the power reception apparatus 220 is confirmed (steps S151 and S152). The control of the power reception apparatus 220 illustrated in FIG. 2A may be repeated until a wireless signal is received from the power reception apparatus 220 at step S152. In addition, at steps S154 through S157 in which the power transmission apparatus 210 controls the transmission power, the control of the power reception apparatus 220 illustrated in FIG. 2A may be repeated.

In the present example, each of the power transmission apparatus 210 and the power reception apparatus 220 are controlled to have the input voltage Vmod larger than the first threshold V1 and below the second threshold V2. In this manner, the power feeding system 200 can feed power while keeping the power transmission apparatus 210 and the power reception apparatus 220 coupled to each other, even in situations where the control of the input voltage Vmod is difficult, such as cases where the number of power reception apparatus 220 corresponding to one power transmission apparatus 210 changes or the positions thereof change. The power feeding system 200 of the present example can set the input voltage Vmod to a communicable area even in a situation where wireless signals cannot be received by the power transmission apparatus 210.

Figure 2C:
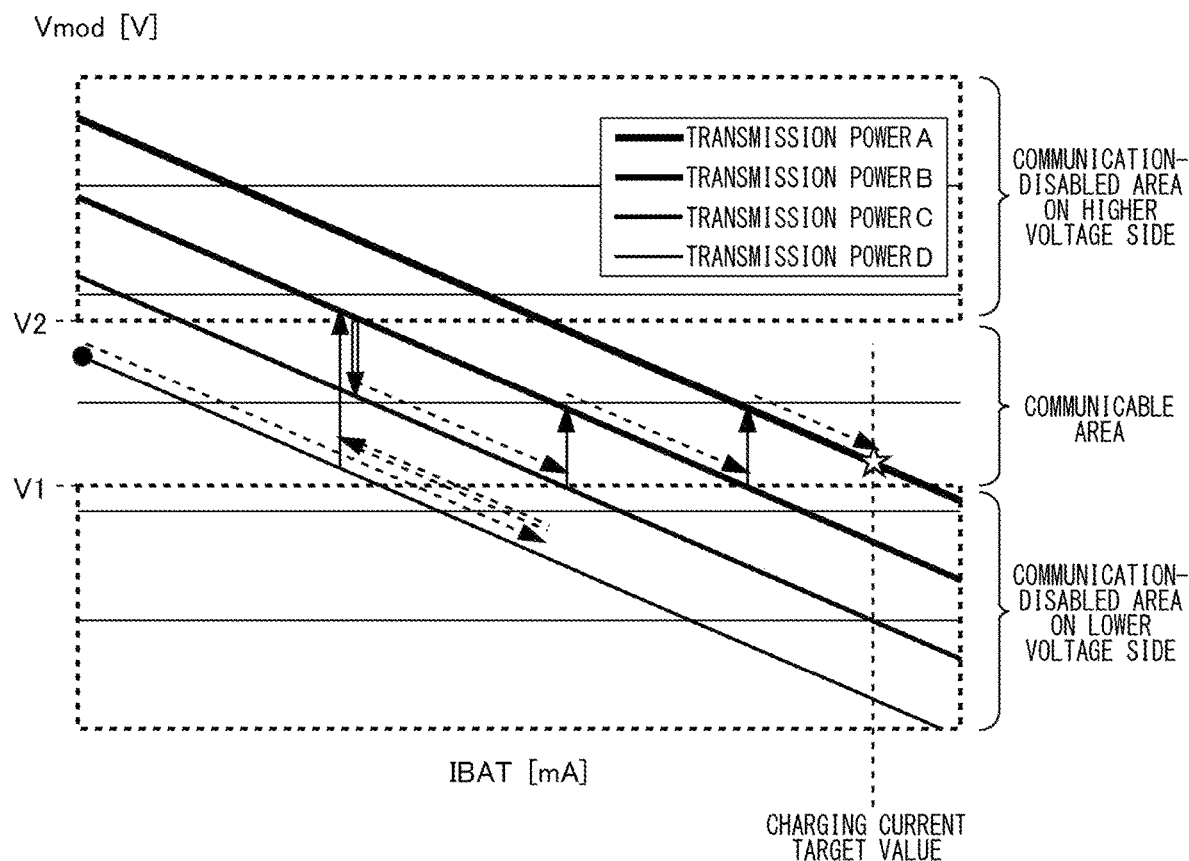
FIG. 2C illustrates an example of a method for controlling the charging current IBAT and the input voltage Vmod.

FIG. 2C illustrates an example of a method for controlling the charging current IBAT and the input voltage Vmod. The vertical axis indicates the input voltage Vmod [V] and the horizontal axis indicates the charging current IBAT [mA].

With the transmission power D, the input voltage Vmod of the power feeding system 200 may become equal to or smaller than the first threshold V1 when the charging current IBAT is increased. In this case, the power reception apparatus 220 reduces the charging current IBAT, thereby causing the input voltage Vmod to become larger than the first threshold V1. Subsequently, by increasing the transmission power from transmission power D to transmission power B, the input voltage Vmod may become equal to or larger than the second threshold V2. In this case, the power transmission apparatus 210 reduces the transmission power B to transmission power C. Then, after the charging current IBAT is increased, the power transmission apparatus 210 increases the transmission power to transmission power B. By repeating such control, the power feeding system 200 can bring the charging current IBAT closer to the target value Ig.

Figure 3:
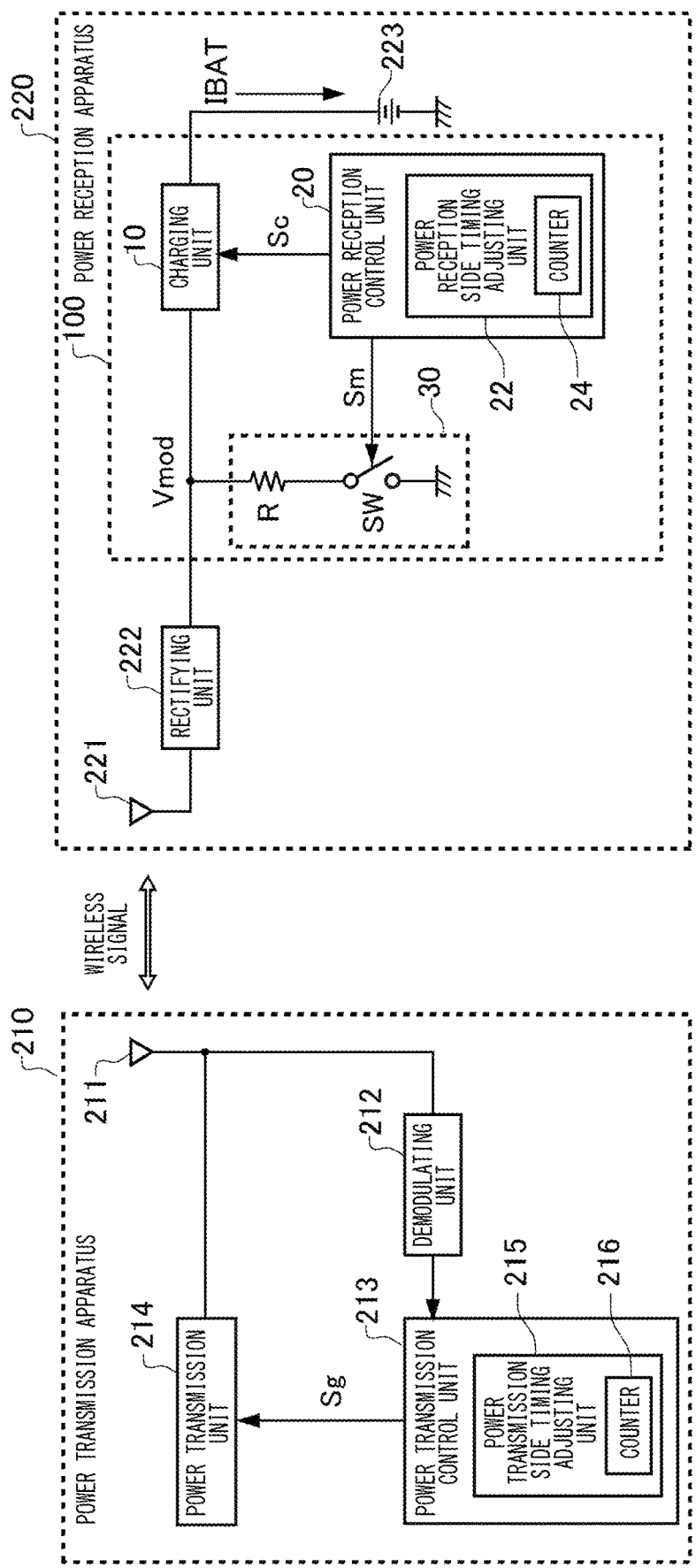
FIG. 3 illustrates an example of a configuration of the power feeding system 200.

FIG. 3 illustrates an example of a configuration of the power feeding system 200. The power reception control unit 20 of the present example has a power reception side timing adjustment unit 22. The power transmission control unit 213 has a power transmission side timing adjustment unit 215.

The power reception side timing adjustment unit 22 adjusts timing for controlling the charging current IBAT. The power reception side timing adjustment unit 22 waits for a communication period to elapse after adjusting the charging current IBAT, before performing the next adjustment of the charging current IBAT. Waiting for at least a communication period to elapse prevents erroneous control before the content of the latest wireless communication is reflected.

The power reception side counter 24 is provided on the power reception side timing adjustment unit 22. The power reception side counter 24 counts the number of elapse of the communication period in a case where the input voltage Vmod is larger than the first threshold V1, and where the charging current IBAT is below the target value Ig. The power reception side timing adjustment unit 22 increases the charging current IBAT in a case where the number of elapse is equal to or more than a predetermined first count threshold N. Note that, the power reception side counter 24 of the present example counts the number of elapse of the communication period, but the object to be counted is not limited thereto.

The power transmission side timing adjustment unit 215 adjusts timing for controlling the transmission power. For example, the power transmission side timing adjustment unit 215 waits for a communication period to elapse after adjusting the transmission power, before performing the next adjustment of the transmission power.

The power transmission side counter 216 is provided on the power transmission side timing adjustment unit 215. The power transmission side counter 216 counts the number of elapse of the communication period in a case where a modulation signal is not received. The power transmission side timing adjustment unit 215 reduces the transmission power in a case where the number of elapse is equal to or more than a predetermined second count threshold M. Note that, the power transmission side counter 216 of the present example counts the number of elapse of the communication period, but the object to be counted is not limited thereto.

Figure 4A:
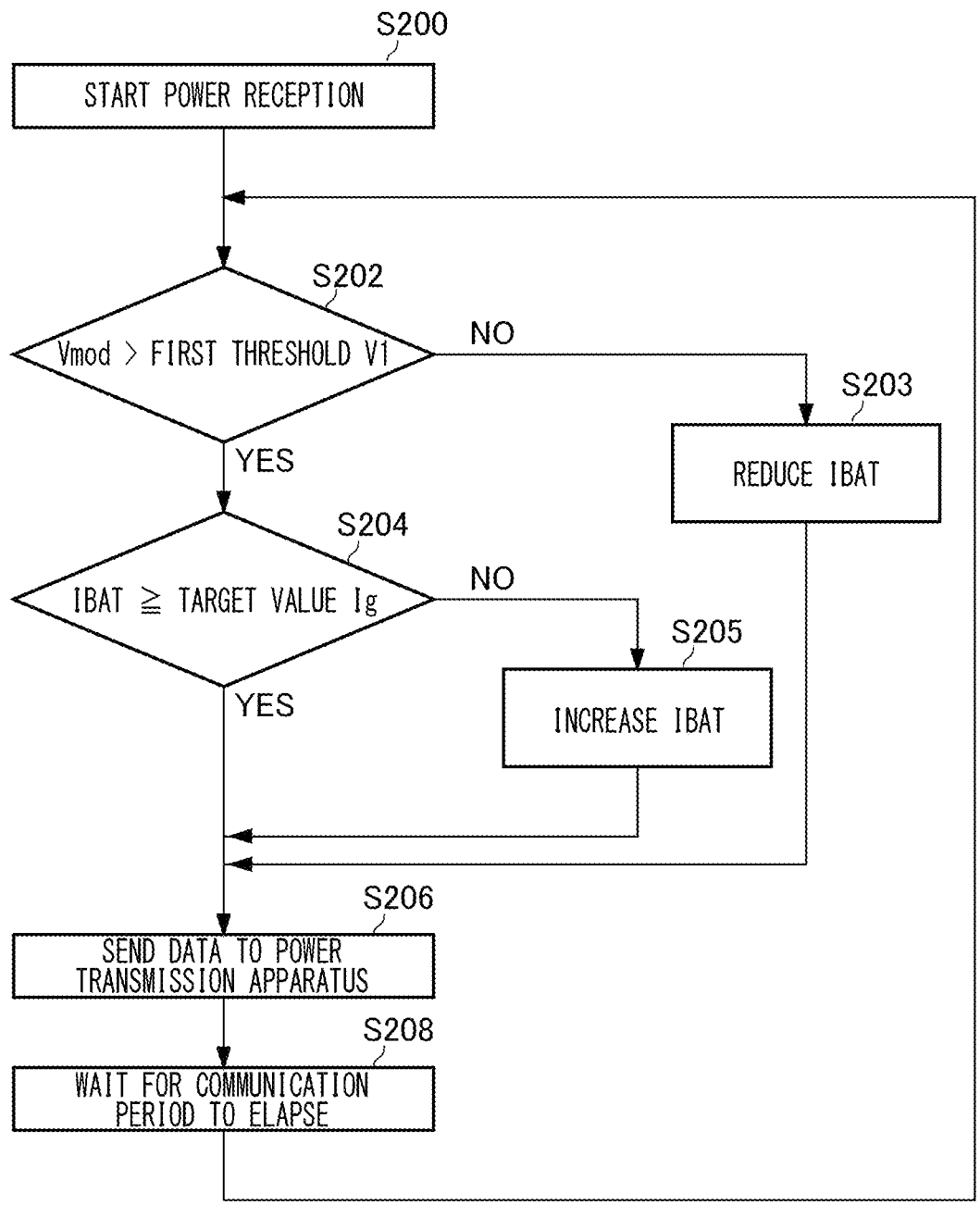
FIG. 4A illustrates an example of an operation flowchart of a power reception apparatus 220 according to a second embodiment.

FIG. 4A illustrates an example of an operation flowchart of a power reception apparatus 220 according to a second embodiment. Steps S200 through S206 are identical to steps S100 through S106 in FIG. 2A. The present example differs from the case in FIG. 2A in having step S208 before step S206. In the present example, difference with FIG. 2A will be particularly described.

At step S208, the power reception apparatus 220 waits for a communication period with the power transmission apparatus 210 to elapse before returning to step S202. That is, the increase and decrease of the charging current IBAT at step S203 or step S205 is performed after waiting for a period that is equal to or longer than the communication period to elapse. In this manner, time for the power transmission apparatus 210 to perform electrical power control after receiving communication can be ensured. The standby time at step S208 may be controlled by the power reception side timing adjustment unit 22.

Figure 4B:
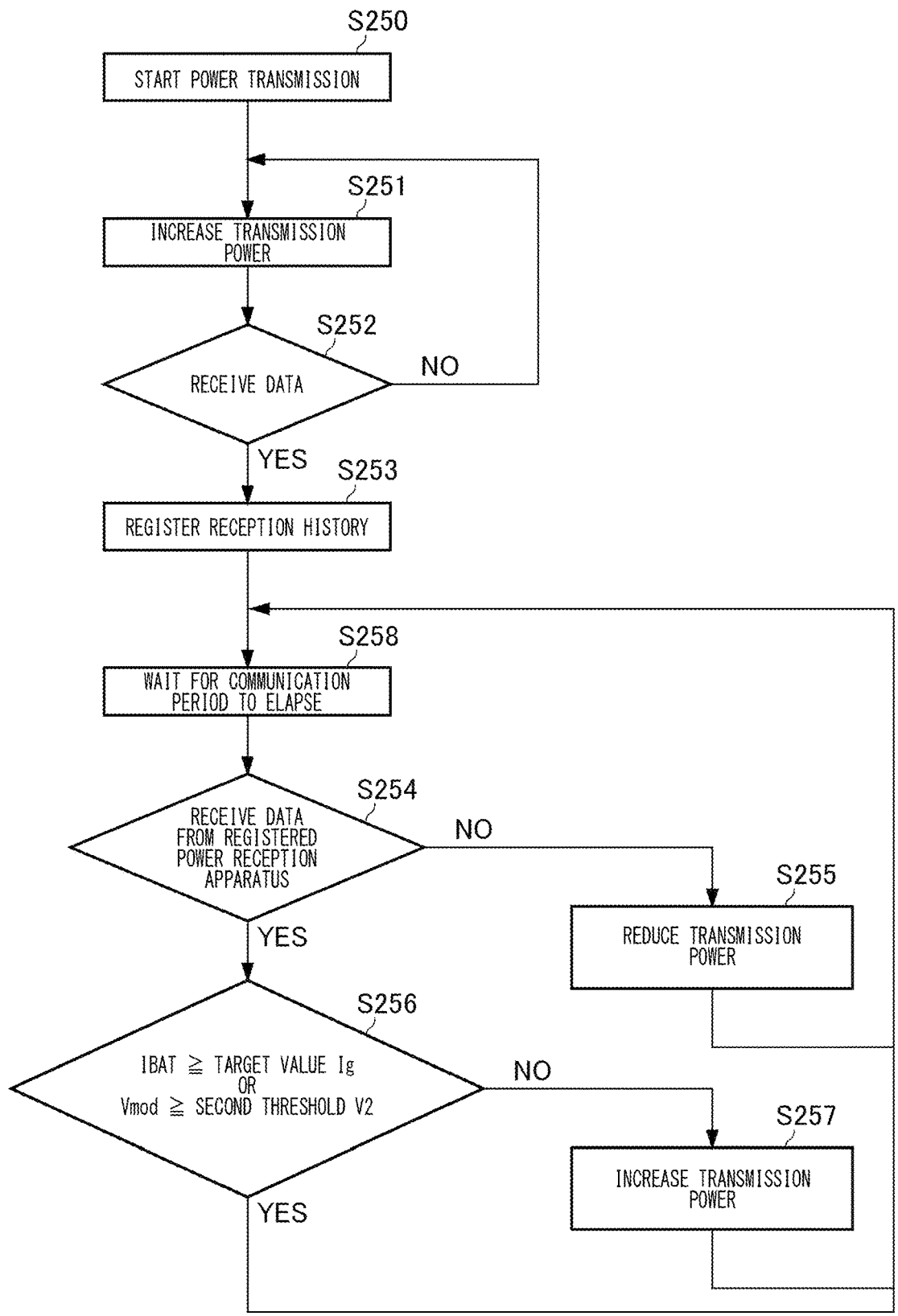
FIG. 4B illustrates an example of an operation flowchart of the power transmission apparatus 210 according to the second embodiment.

FIG. 4B illustrates an example of an operation flowchart of the power transmission apparatus 210 according to the second embodiment. Steps S250 through S257 are identical to steps S150 through S157 in FIG. 2B. The present example differs from the case in FIG. 2B in having step S258 before step S254. In the present example, difference with the FIG. 2B will be particularly described.

At step S258, the power transmission apparatus 210 waits for a communication period to elapse before receiving data from the power reception apparatus 220 registered at step S254. The standby time at step S258 may be controlled by the power transmission side timing adjustment unit 215. Note that, the power transmission control unit 213 may wait for a predetermined period, which is not limited to the communication period, to elapse before proceeding to step S254.

Figure 5A:
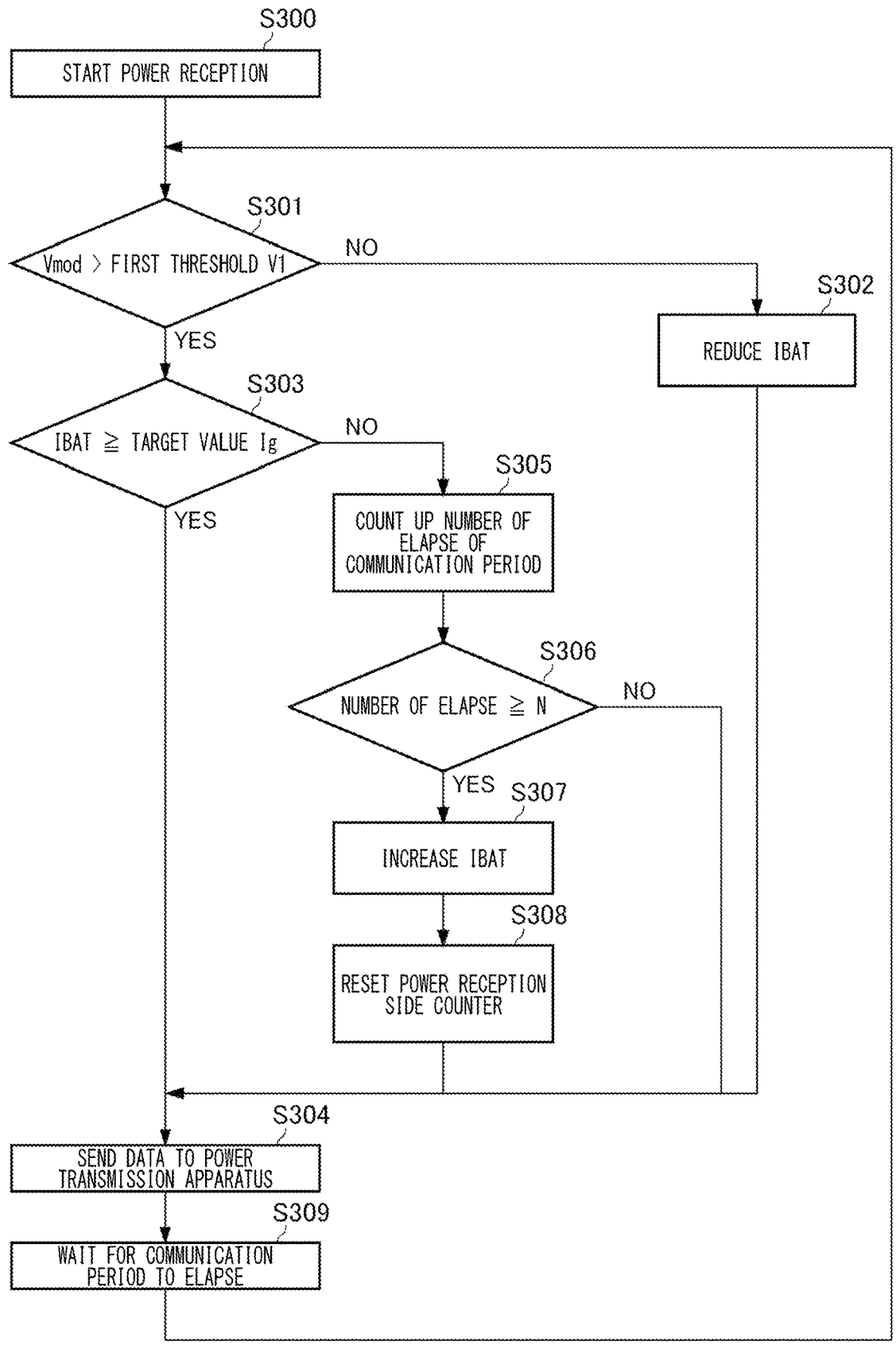
FIG. 5A illustrates an example of an operation flowchart of the power reception apparatus 220 according to a third embodiment.

FIG. 5A illustrates an example of an operation flowchart of the power reception apparatus 220 according to a third embodiment. The process of increasing the charging current IBAT performed by the power reception control unit 20 in the present example differs from that in the case in FIG. 4A.

At step S300, power reception by the power reception apparatus 220 starts.

At step S301, it is determined whether input voltage Vmod>first threshold V1 is met. If input voltage Vmod>first threshold V1 is met, the process proceeds to step S303. If input voltage Vmod>first threshold V1 is not met, the charging current IBAT is reduced (step S302). That is, the charging current IBAT is reduced in a case where the input voltage Vmod is equal to or smaller than the first threshold V1.

At step S303, it is determined whether charging current IBAT≥target value Ig is met. If charging current IBAT≥target value Ig is met, the process proceeds to step S304. If charging current IBAT≥target value Ig is not met, the power reception side counter 24 is counted up (step S305). At step S306, it is determined whether the number of elapse of the communication period counted by the power reception side counter 24 is equal to or more than the first count threshold N. If the number of elapse is equal to or more than the first count threshold N, the charging current IBAT is increased (step S307) and the power reception side counter 24 is reset (step S308). On the other hand, if the number of elapse is less than the first count threshold N, the charging current IBAT is not increased. Subsequently, at step S304, data is sent to the power transmission apparatus 210.

Figure 5B:
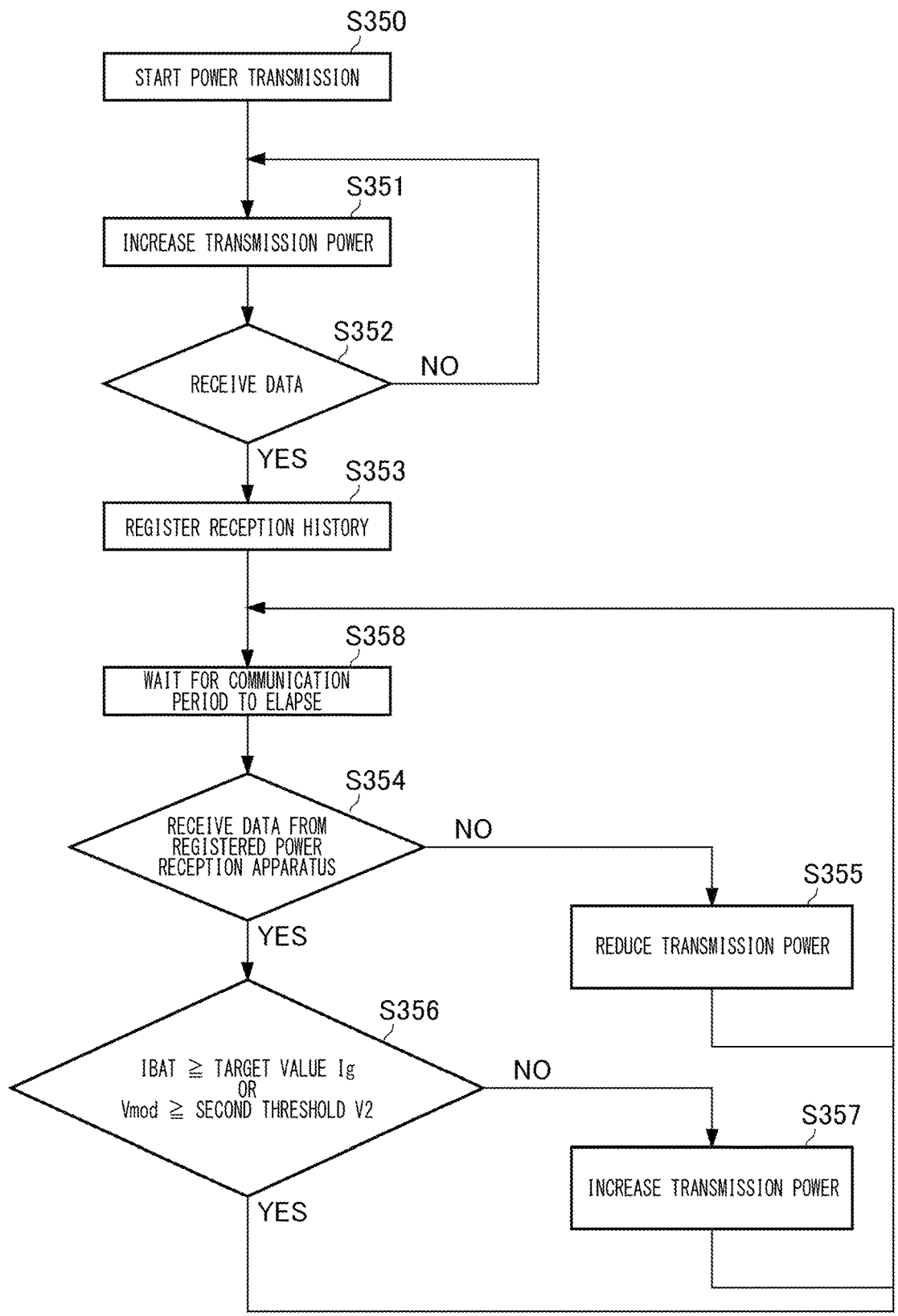
FIG. 5B illustrates an example of an operation flowchart of the power transmission apparatus 210 according to the third embodiment.

FIG. 5B illustrates an example of an operation flowchart of the power transmission apparatus 210 according to the third embodiment. Steps S350 through S358 of the present example are identical to steps S250 through S258 in FIG. 4B. That is, the operation flowchart of the power transmission apparatus 210 according to the third embodiment may be identical to the operation flowchart of the power transmission apparatus 210 according to the second embodiment.

Figure 5C:
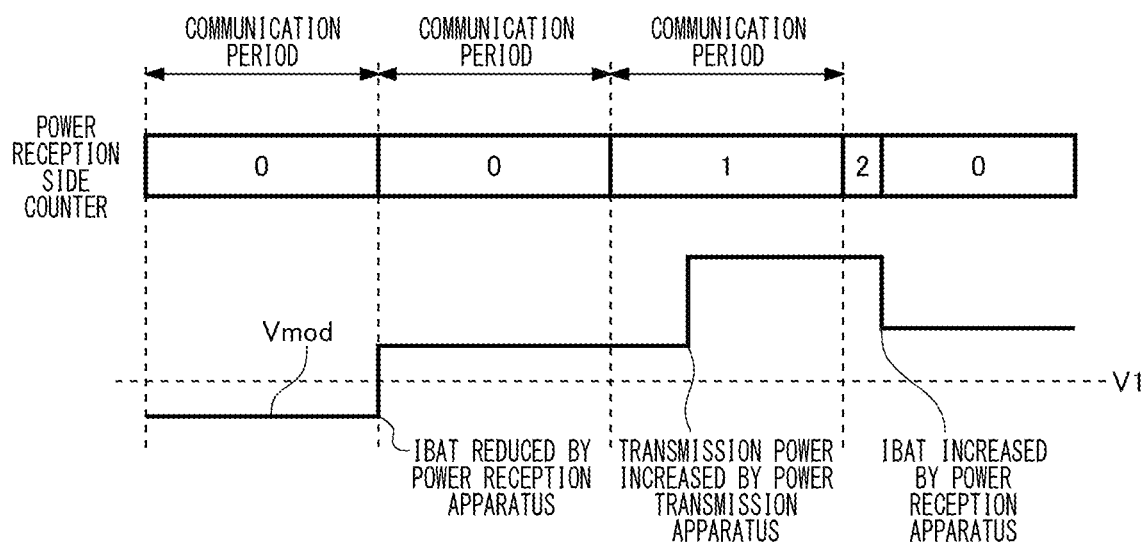
FIG. 5C illustrates an example of a timing diagram according to the second embodiment.

FIG. 5C illustrates an example of a timing diagram according to the second embodiment. In the present example, a timing diagram where the first count threshold N=2 is shown. The communication period and the waveform of the input voltage Vmod are shown.

When the input voltage Vmod becomes equal to or smaller than the first threshold V1, the charging current IBAT is reduced, and thereby the input voltage Vmod exceeds the first threshold V1. The power transmission apparatus 210 increases the transmission power before the number of counts of the power reception side counter 24 turns to 2. Therefore, the input voltage Vmod can be maintained at a value that is larger than the first threshold V1 even in a case where the number of counts by the power reception side counter 24 turns to 2 and the charging current IBAT is increased and the input voltage Vmod is reduced by the power reception apparatus 220.

Figure 6A:
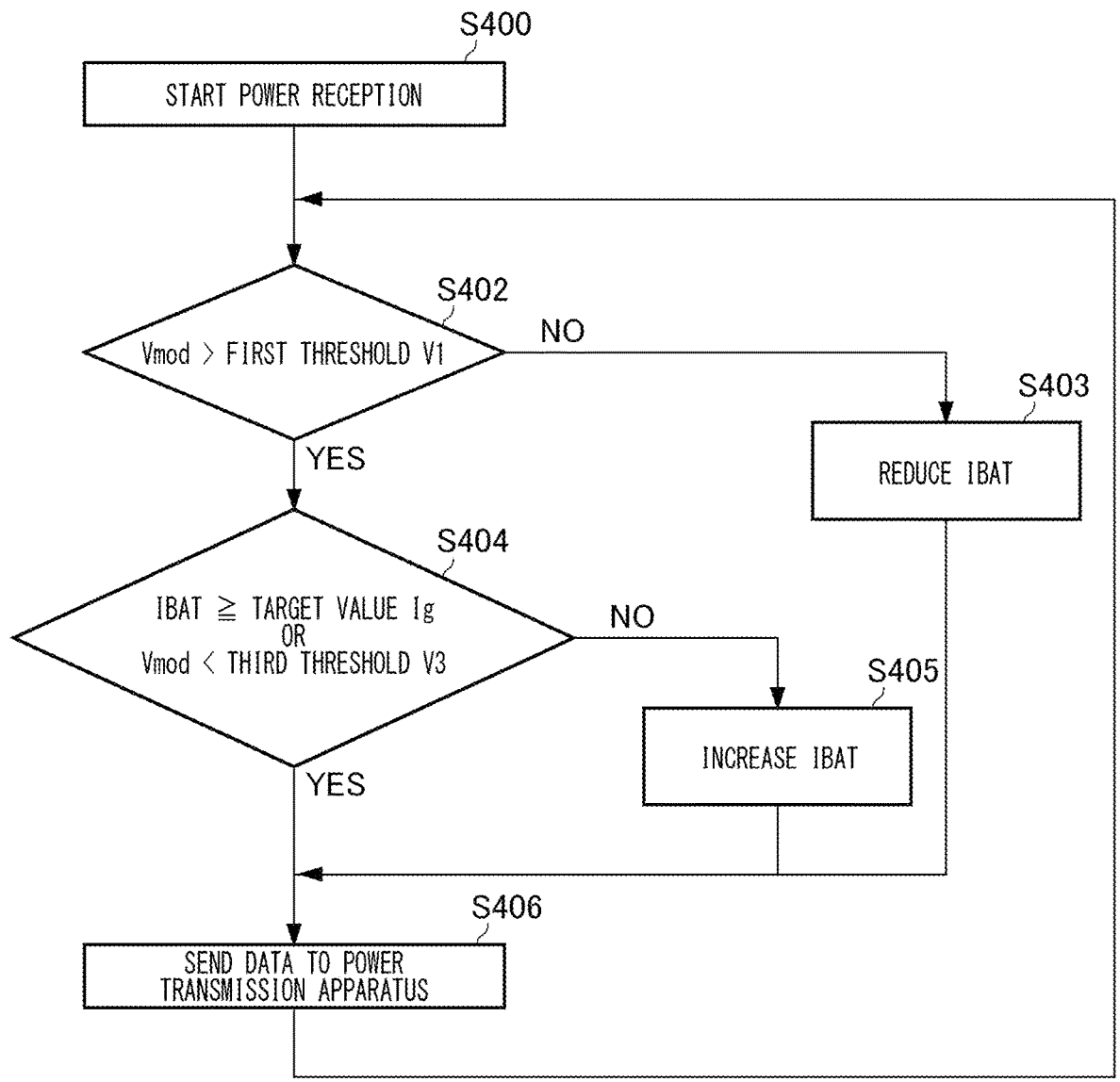
FIG. 6A illustrates an example of an operation flowchart of the power reception apparatus 220 according to a fourth embodiment.

FIG. 6A illustrates an example of an operation flowchart of the power reception apparatus 220 according to a fourth embodiment. The power feeding system 200 of the present example differs from the first embodiment in that third threshold V3 is set. Steps S400 through S406 are identical to steps S100 through S106 except that the third threshold V3 is used at step S404. In the present example, difference with the first embodiment will be particularly described.

At step S404, it is determined whether charging current IBAT≥target value Ig or input voltage Vmod<third threshold V3 is met. If charging current IBAT≥target value Ig or input voltage Vmod<third threshold V3 is met, the power reception apparatus 220 sends data to the power transmission apparatus 210 (step S406). If charging current IBAT≥target value Ig or input voltage Vmod<third threshold V3 is not met, the charging current IBAT is increased (step S405). That is, the charging current IBAT is increased in a case where the input voltage Vmod is larger than the first threshold V1 and where the charging current IBAT is smaller than the target value Ig and the input voltage Vmod is equal to or larger than the third threshold V3.

The third threshold V3 is larger than the first threshold V1. The third threshold V3 may be a fixed value or may be a variable value, in the same manner as the first threshold V1. In a case where the third threshold V3 is a variable value, it may be varied according to the battery voltage of the power storage unit 223. At least one of the first threshold V1 or the third threshold V3 may be set according to the battery voltage of the power storage unit 223. The power reception control unit 20 increases the charging current IBAT in a case where the input voltage Vmod is equal to or larger than the third threshold V3. In this manner, the power feeding system 200 can prevent the input voltage Vmod from becoming equal to or smaller than the first threshold V1 when the charging current IBAT is increased.

Here, the input voltage Vmod may enter the communication-disabled area on the lower voltage side causing communication disability if the increase of the transmission power by the power transmission apparatus 210 is delayed relative to the increase of the charging current IBAT by the power reception apparatus 220. The charging apparatus 100 of the present example prevents the input voltage Vmod from entering the communication-disabled area on the lower voltage side and causing communication disability by setting a third threshold V3.

Figure 6B:
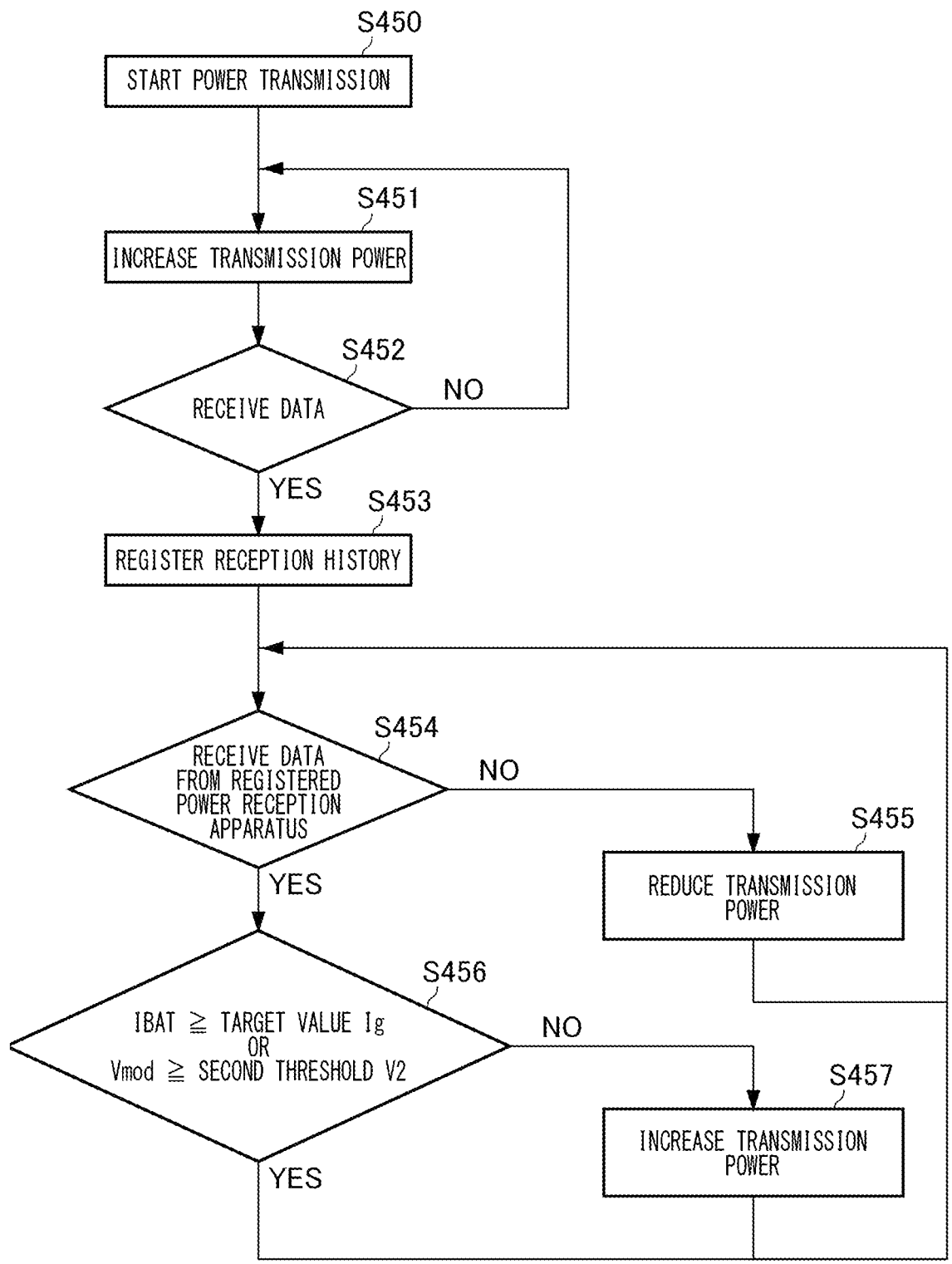
FIG. 6B illustrates an example of an operation flowchart of the power transmission apparatus 210 according to the fourth embodiment.

FIG. 6B illustrates an example of an operation flowchart of the power transmission apparatus 210 according to the fourth embodiment. Steps S450 through S457 of the present example are identical to steps S150 through S157 in FIG. 2B. That is, the operation flowchart of the power transmission apparatus 210 according to the fourth embodiment may be identical to the operation flowchart of the power transmission apparatus 210 according to the first embodiment.

Figure 7A:
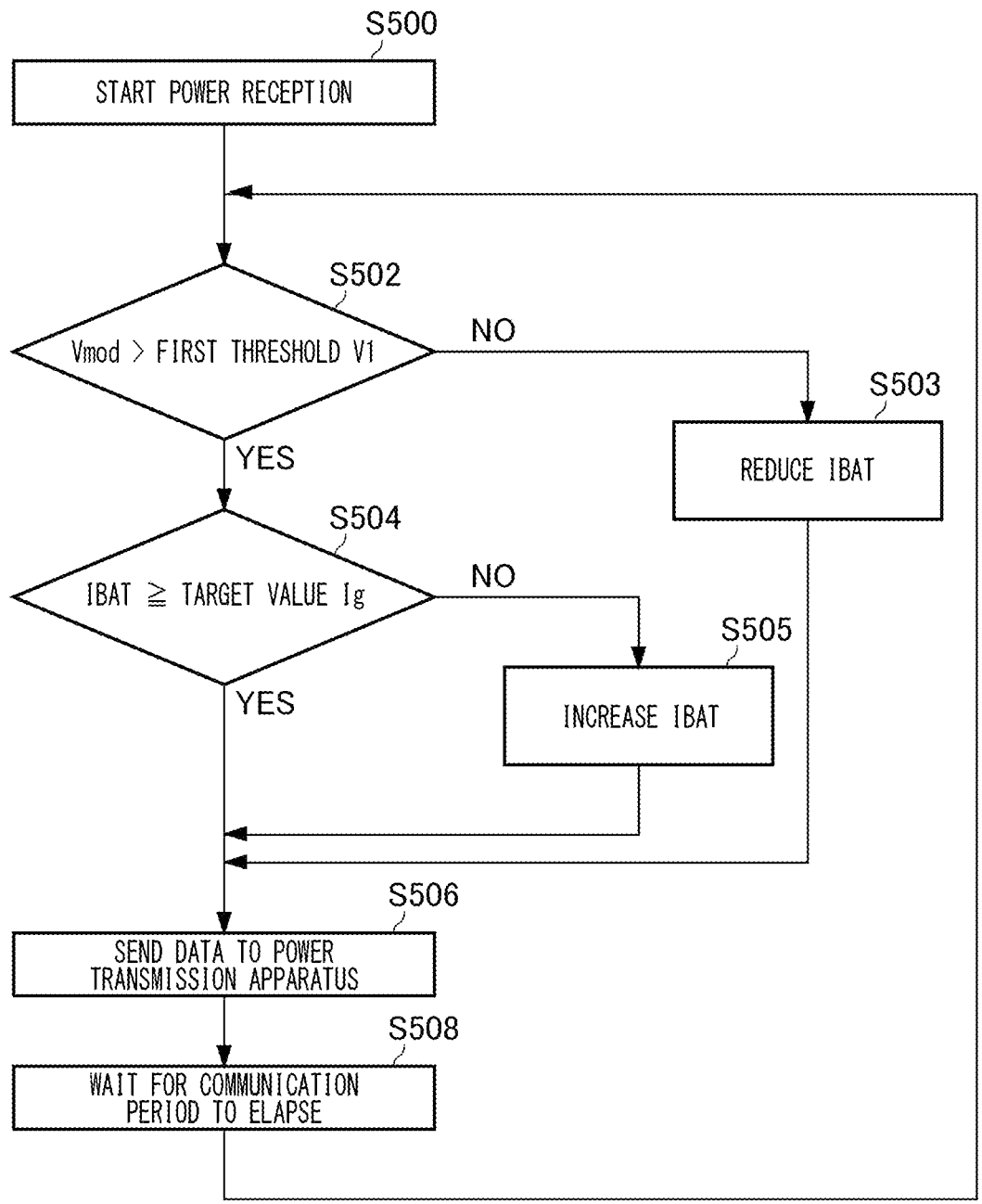
FIG. 7A illustrates an example of an operation flowchart of the power reception apparatus 220 according to a fifth embodiment.

FIG. 7A illustrates an example of an operation flowchart of the power reception apparatus 220 according to a fifth embodiment. Steps S500 through S508 in the present example are identical to steps S200 through S208 in FIG. 4A. That is, the operation flowchart of the power reception apparatus 220 according to the fifth embodiment may be identical to the operation flowchart of the power reception apparatus 220 according to the second embodiment.

Figure 7B:
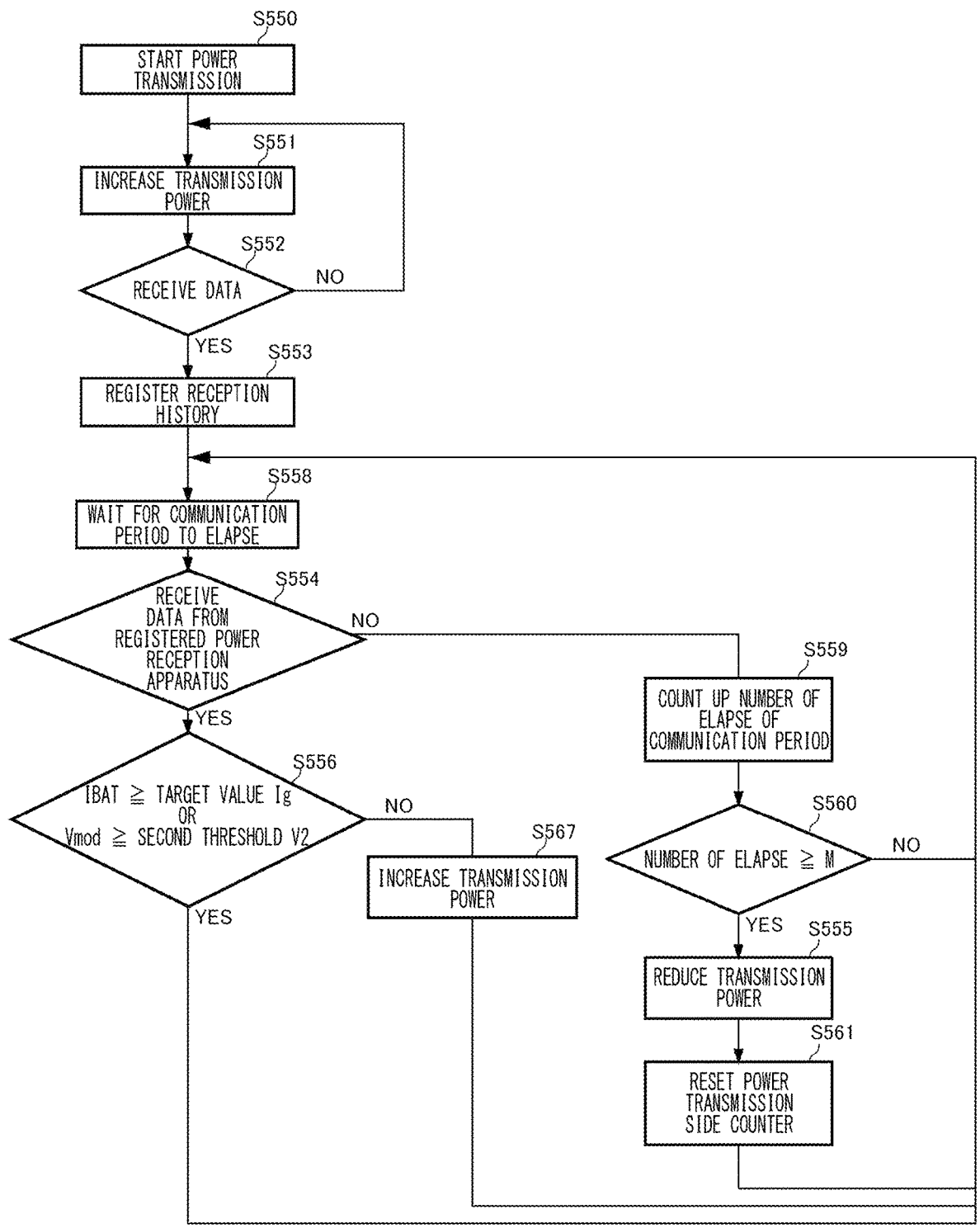
FIG. 7B illustrates an example of an operation flowchart of the power transmission apparatus 210 according to the fifth embodiment.

FIG. 7B illustrates an example of an operation flowchart of the power transmission apparatus 210 according to the fifth embodiment. Steps S550 through S558 are identical to steps S250 through S258 in FIG. 4B except for the process of reducing the transmission power by the power transmission control unit 213.

At step S554, it is determined whether data is received from the power reception apparatus 220 for which reception history has been registered at step S553. If data is received from the power reception apparatus 220, the process proceeds to step S556. The process after step S556 may be identical to the process after step S256. On the other hand, if data is not received from the registered power reception apparatus 220, the process proceeds to step S559.

At step S559, the power transmission side counter 216 is counted up. At step S560, it is determined whether the number of elapse of the communication period counted by the power transmission side counter 216 is equal to or more than the second count threshold M. If the number of elapse is equal to or more than the second count threshold M, the transmission power is reduced (step S555), and the power transmission side counter 216 is reset (step S561). That is, the power transmission side timing adjustment unit 215 receives modulation signal from the power reception apparatus 220, and in a case where modulation signal is not received for a predetermined period after receiving the previous modulation signal, reduces the transmission power. On the other hand, if the number of elapse is less than the second count threshold M, the transmission power is not reduced and the process returns to step S558.

Figure 7C:
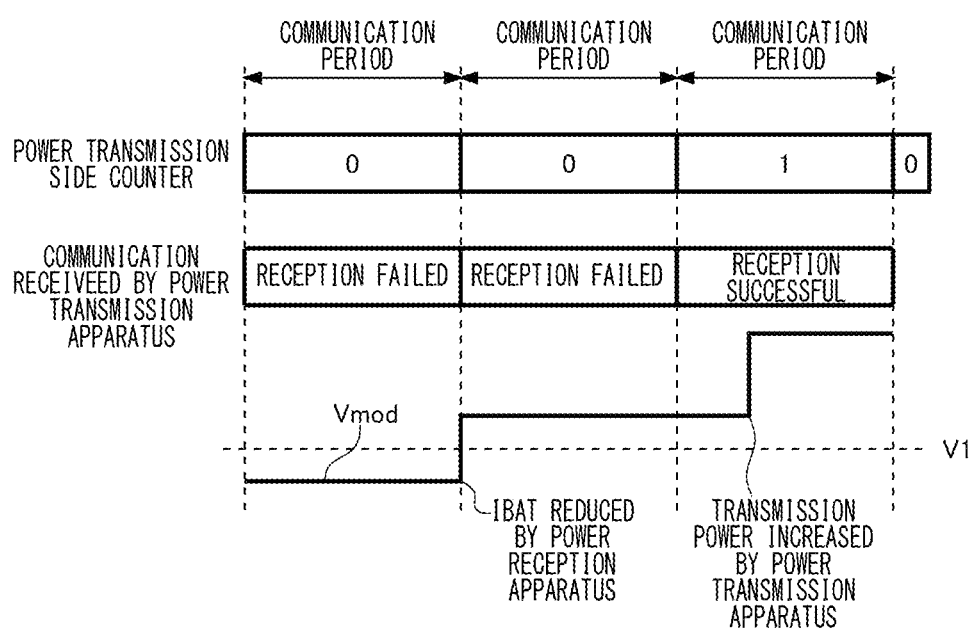
FIG. 7C illustrates an example of a timing diagram according to the fifth embodiment.

FIG. 7C illustrates an example of a timing diagram according to the fifth embodiment. In the present example, a timing diagram where the second count threshold M=2 is shown. A situation in which wireless signal cannot be received by the power transmission apparatus 210 due to a fall in the input voltage Vmod will be described. In this case, the power transmission apparatus 210 does not need to reduce the transmission power, and the power reception apparatus 220 increases the input voltage Vmod to set it in the communicable area by reducing the charging current IBAT. In a case where the input voltage Vmod is in the communicable area, the power transmission apparatus 210 may increase the transmission power to bring the charging current IBAT closer to the target value Ig.

Note that, communication may fail due to the influence of random noise, even when the input voltage Vmod is set in the communicable area. Even in such cases, the transmission power does not have to be reduced as long as wireless signal can be received before the number of counts of the power transmission side counter 216 turns to the second count threshold M. Therefore, influence by random noise will be reduced.

Figure 7D:
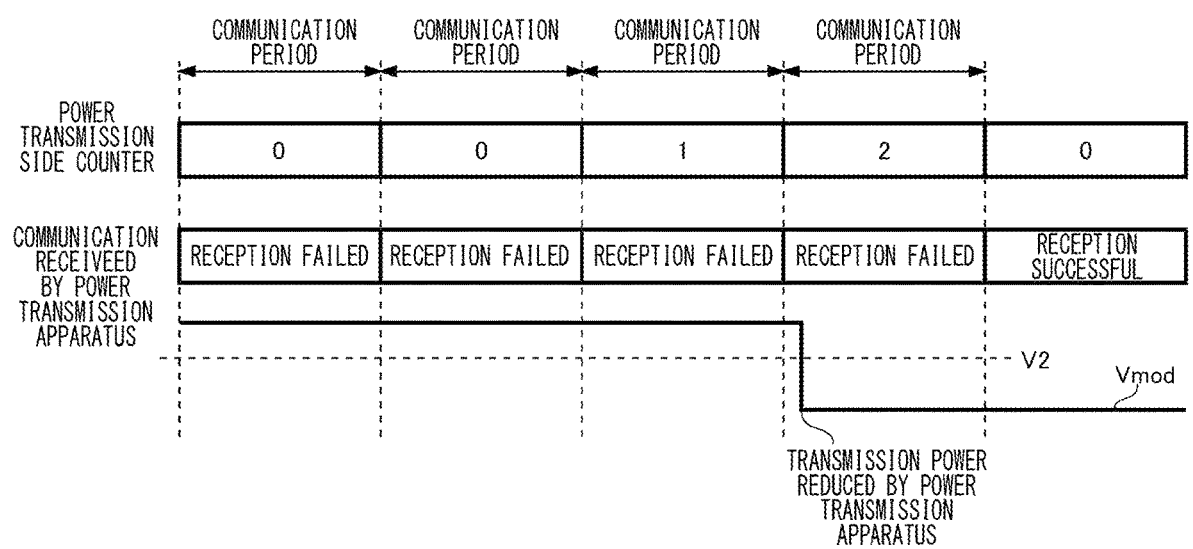
FIG. 7D illustrates an example of a timing diagram according to the fifth embodiment.

FIG. 7D illustrates an example of a timing diagram according to the fifth embodiment. In the present example, a timing diagram where the second count threshold M=2 is shown. A situation in which wireless signal cannot be received by the power transmission apparatus 210 due to the input voltage Vmod becoming equal to or larger than the second threshold V2 will be described. In this case, since communication will not be restored by the power reception apparatus 220, the power transmission apparatus 210 will continuously be unable to receive wireless signals. Subsequently, when the number of counts of the power transmission side counter 216 turns to M=2, the power transmission apparatus 210 lowers the transmission power. In this manner, the input voltage Vmod can be set in the communicable area.

In this manner, when there is no communication after waiting for a time period that is equal to the time for the communication to be restored by the control on the power reception apparatus 220 side or longer, the cause can be limited to be due to excess in transmission power. Therefore, communication can be restored by reducing the transmission power.

Figure 8A:
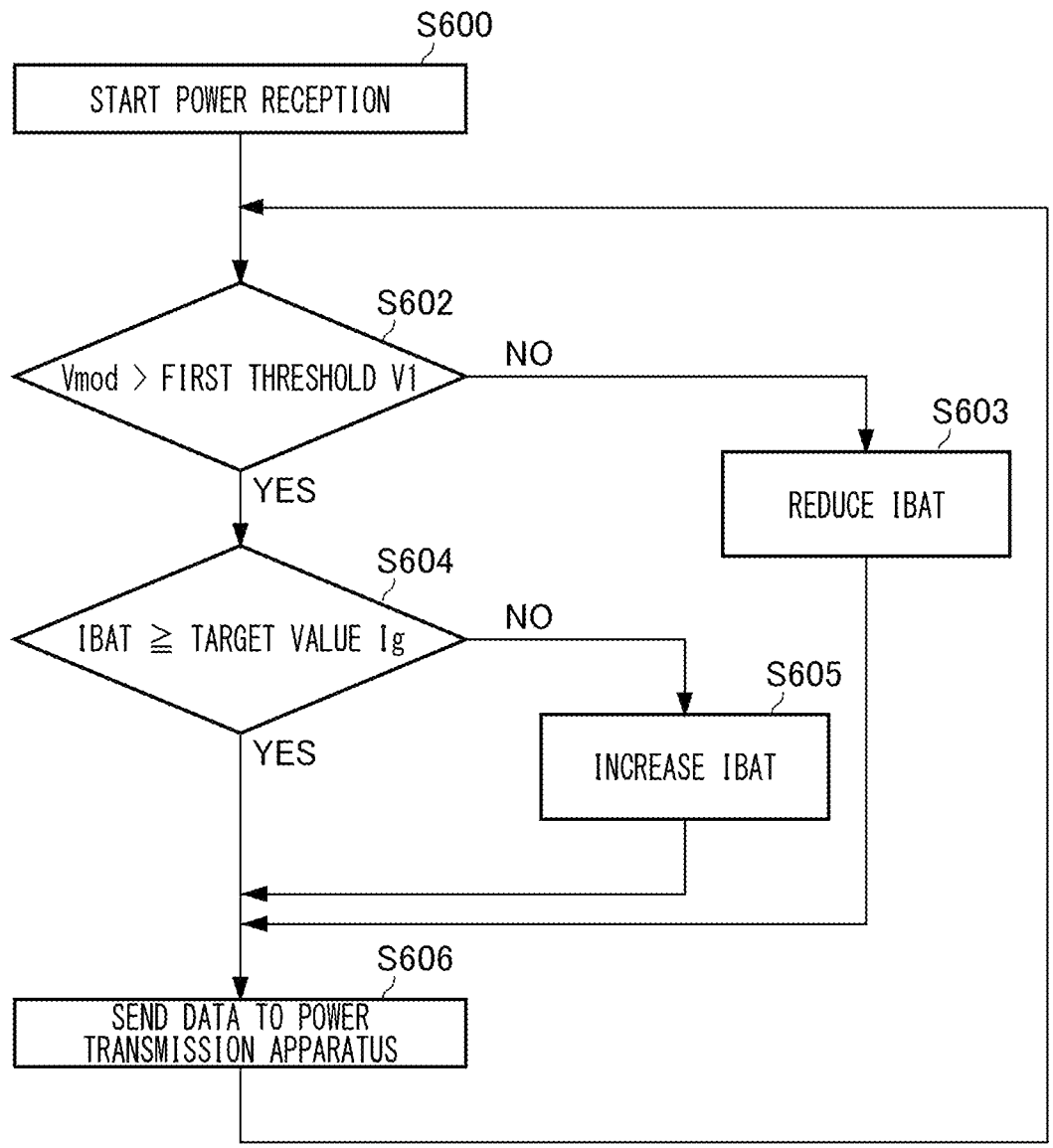
FIG. 8A illustrates an example of an operation flowchart of the power reception apparatus 220 according to a sixth embodiment.

FIG. 8A illustrates an example of an operation flowchart of the power reception apparatus 220 according to a sixth embodiment. Steps S600 through S606 in the present example are identical to steps S100 through S106 in FIG. 2A. That is, the operation flowchart of the power reception apparatus 220 according to the sixth embodiment may be identical to the operation flowchart of the power reception apparatus 220 according to the first embodiment.

Figure 8B:
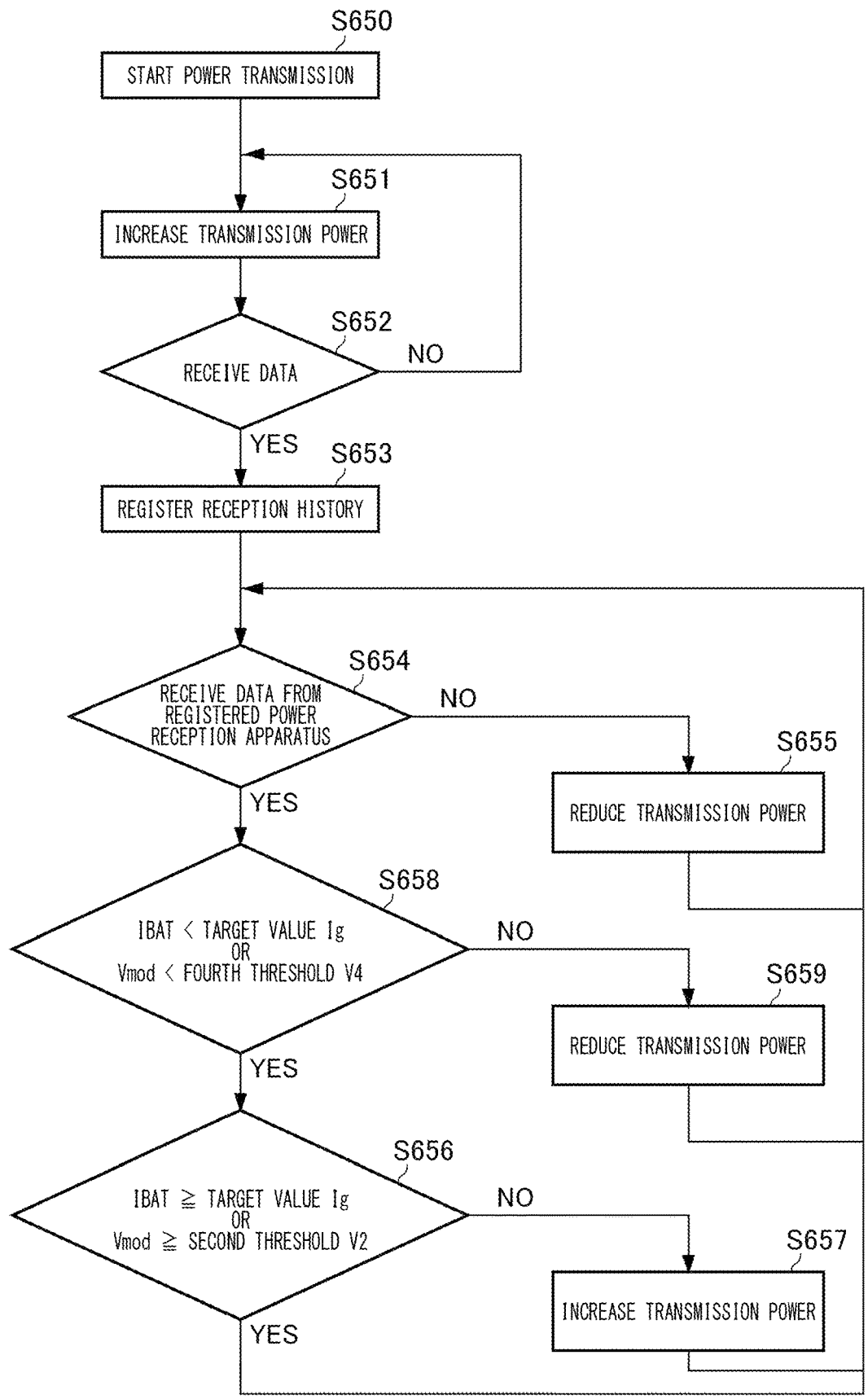
FIG. 8B illustrates an example of an operation flowchart of the power transmission apparatus 210 according to the sixth embodiment.

FIG. 8B illustrates an example of an operation flowchart of the power transmission apparatus 210 according to the sixth embodiment. The power feeding system 200 of the present example differs from the first embodiment in that the fourth threshold V4 is set. Steps S650 through S657 are identical to steps S150 through S157 except having steps S658 and S659. In the present example, difference with the first embodiment will be particularly described.

Step S658 is performed in a case where data is received from the power reception apparatus 220 registered at step S654. At step S658, it is determined whether charging current IBAT<target value Ig or input voltage Vmod<fourth threshold V4 is met. The fourth threshold V4 is smaller than the second threshold V2. If charging current IBAT<target value Ig or input voltage Vmod<fourth threshold V4 is met, the process proceeds to step S656. If charging current IBAT<target value Ig or input voltage Vmod<fourth threshold V4 is not met, the transmission power is reduced (step S659).

The power transmission apparatus 210 of the present example prevents the charging current IBAT from becoming equal to or larger than the target value Ig and the power feeding system 200 from consuming excess energy, by reducing the transmission power, in a case where there is communication from the power reception apparatus 220, the charging current IBAT is equal to or larger than the target value Ig, and the input voltage Vmod is equal to or larger than the fourth threshold V4.

Here, the input voltage Vmod may enter the communication-disabled area on the higher voltage side causing communication disability if the transmission power is increased by the power transmission apparatus 210 before the charging current IBAT is increased by the power reception apparatus 220. The charging apparatus 100 of the present example prevents the input voltage Vmod from entering the communication-disabled area on the higher voltage side and causing communication disability by setting a fourth threshold V4.

Note that, the method for controlling the power transmission apparatus 210 and the power reception apparatus 220 according to the first embodiment through the sixth embodiment are merely examples, and each of the embodiments may be used in combination in order to control the input voltage Vmod to be in an appropriate range to set the charging current IBAT at a target value Ig.

Figure 9:
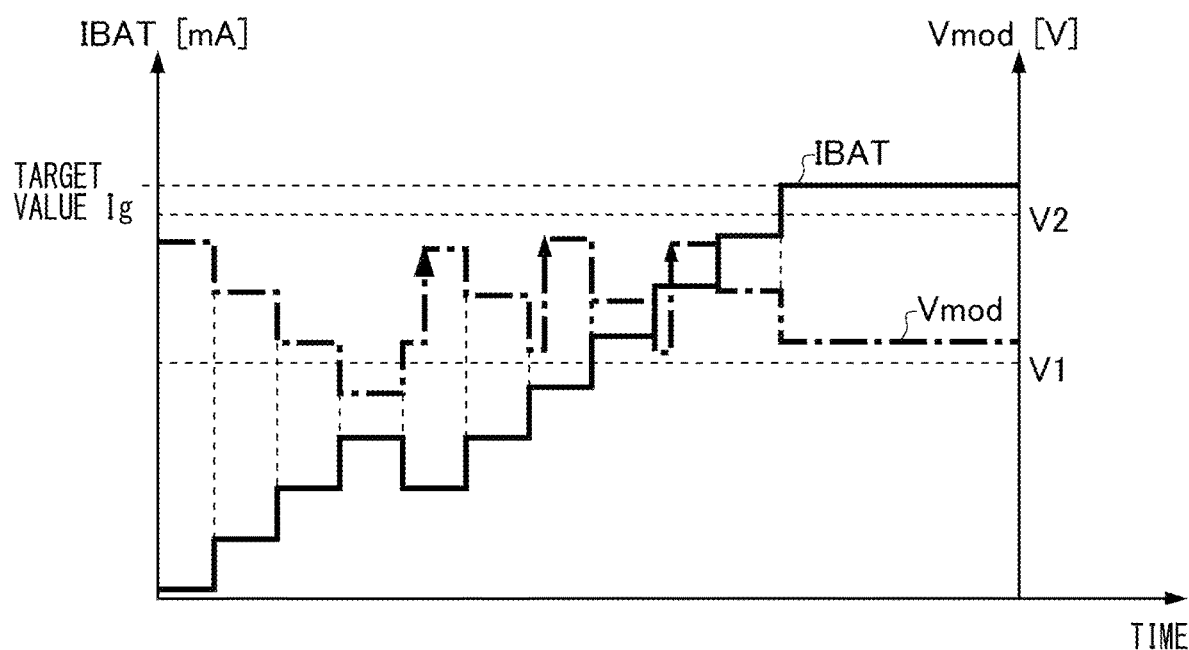
FIG. 9 illustrates an example of temporal change of the charging current IBAT and the input voltage Vmod.

FIG. 9 illustrates an example of temporal change of the charging current IBAT and the input voltage Vmod. The vertical axis indicates the charging current IBAT [mA] and the input voltage Vmod [V], and the horizontal axis indicates any time. In the present example, the solid line indicates the charging current IBAT, and the one dot chain line indicates the input voltage Vmod.

With constant transmission power, the input voltage Vmod is reduced when the charging current IBAT increases. The charging current IBAT of the present example is adjusted at each communication period. When the input voltage Vmod becomes equal to or smaller than the first threshold V1, the charging current IBAT is reduced in the next period to increase the input voltage Vmod. In the graph of the input voltage Vmod, the upward arrow in the one dot chain line indicates where the power transmission apparatus 210 increased the transmission power.

Figure 10:
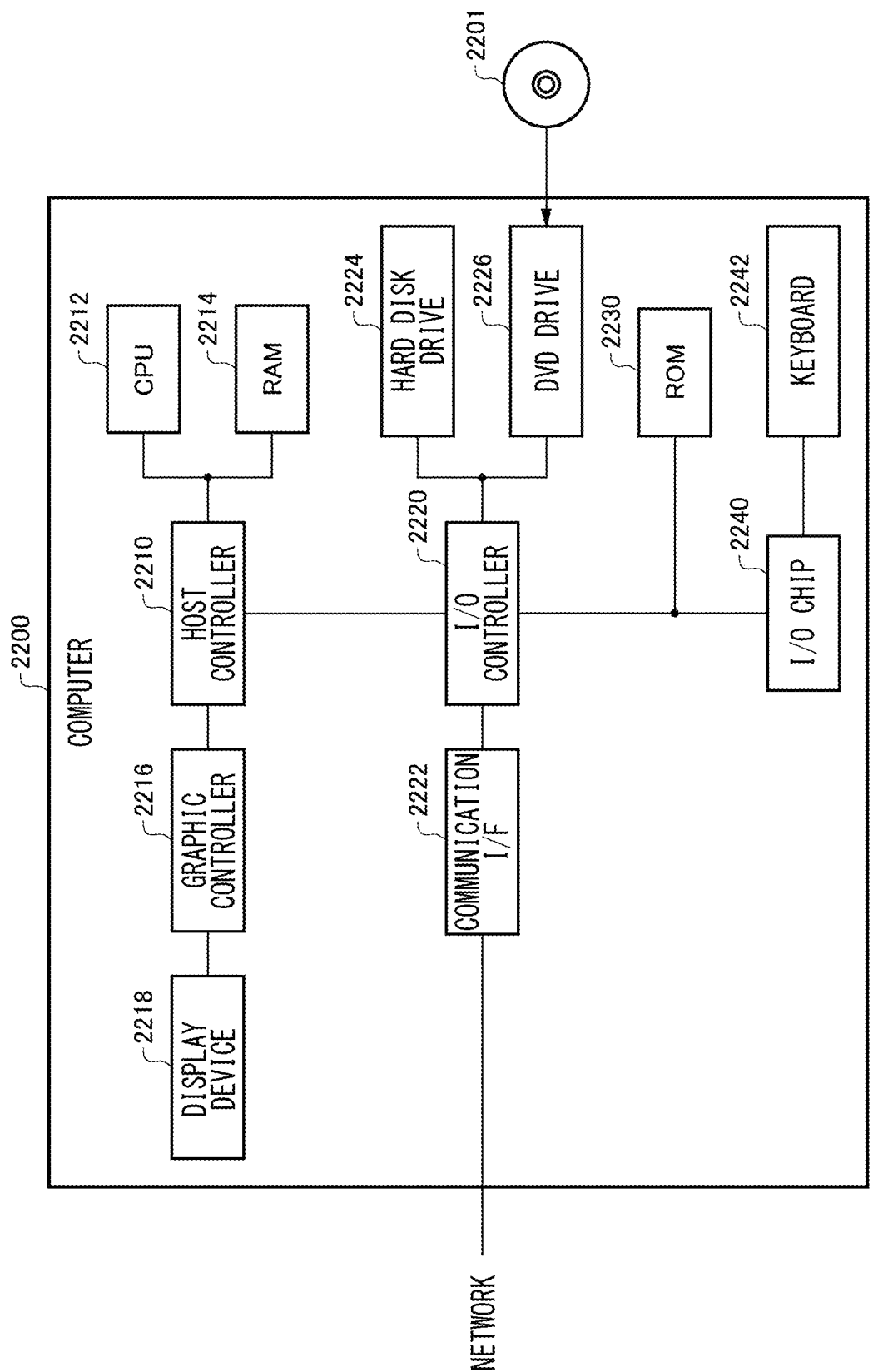
FIG. 10 illustrates an example of a computer 2200 in which a plurality of aspects of the present invention may be embodied entirely or partially.

FIG. 10 illustrates an example of a computer 2200 in which a plurality of aspects of the present invention may be implemented entirely or partially. A program that is installed in the computer 2200 can cause the computer 2200 to function as the operation associated with an apparatus according to embodiments of the present invention or as one or more sections thereof, or cause the computer 2200 to perform the operation or the one or more sections thereof, and/or cause the computer 2200 to perform processes of the embodiment of the present invention or steps thereof. Such a program may be performed by a CPU 2212 so as to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on a display device 2218.

The communication interface 2222 performs communication with other electronic devices via a network. The hard disk drive 2224 stores programs and data that are used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like that is performed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port or the like.

A program is provided by computer readable media such as the DVD-ROM 2201 or the IC card. The program is read from the computer readable media, installed into the hard disk drive 2224, RAM 2214, or ROM 2230, which are also examples of computer readable media, and performed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may perform a communication program loaded onto the RAM 2214 to instruct communication processing to the communication interface 2222, based on the processing described in the communication program. The communication interface 2222, under control of the CPU 2212, reads transmission data stored on a transmission buffer region provided in a recording medium such as the RAM 2214, the hard disk drive 2224, the DVD-ROM 2201, or the IC card, and transmits the read transmission data to a network or writes reception data received from a network into a reception buffer region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations or improvements can be added to the above-described embodiments. It is also apparent from the description of the claims that the embodiments added with such alterations or improvements can be included in the technical scope of the invention.

The operations, procedures, steps, and stages or the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: charging unit, 20: power reception control unit, 22: power reception side timing adjustment unit, 24: power reception side counter, 30: load modulating unit, 100: charging apparatus, 200: power feeding system, 210: power transmission apparatus, 211: antenna, 212: demodulating unit, 213: power transmission control unit, 214: transmission unit, 215: power transmission side timing adjustment unit, 216: power transmission side counter, 220: power reception apparatus, 221: antenna, 222: rectifying unit, 223: power storage unit, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: ROM drive, 2230: ROM, 2240: input/output chip, 2242: keyboard

What is claimed is:

1. A wireless power feeding system comprising:
   a power transmission apparatus configured to transmit predetermined transmission power; and
   a power reception apparatus configured to receive the transmission power and generate input voltage according to the transmission power, the power reception apparatus including a charging unit configured to charge with a charging current according to the input voltage, and a power reception control unit configured to control an amount of the charging current, wherein
   the power transmission apparatus includes a power transmission control unit configured to control an amount of the transmission power,
   the power transmission control unit is configured to receive a modulation signal from the power reception apparatus, and to reduce the transmission power in a case where the modulation signal is not received for a predetermined period after receiving the previous modulation signal,
   the power transmission apparatus and the power reception apparatus are configured to control the input voltage to be larger than a predetermined first threshold and below a second threshold which is larger than the first threshold,
   communication between the power transmission apparatus and the power reception apparatus is performed at each communication period,
   the power reception control unit includes a power reception side timing adjustment unit configured to adjust timing to control the charging current, and
   the power reception side timing adjustment unit is configured to wait for the communication period to elapse after adjusting the charging current, before performing the next adjustment of the charging current.

2. The wireless power feeding system according to claim 1, wherein
   the power reception control unit is configured to reduce the charging current in a case where the input voltage is equal to or smaller than the first threshold.

3. The wireless power feeding system according to claim 1, wherein
   the power reception control unit is configured to increase the charging current in a case where the input voltage is larger than the first threshold, and where the charging current is below a target value.

4. The wireless power feeding system according to claim 1, wherein
   the power reception side timing adjustment unit includes a power reception side counter configured to count the number of elapse of the communication period in a case where the input voltage is larger than the first threshold and where the charging current is below a target value, and the power reception side timing adjustment unit is configured to increase the charging current in a case where the number of elapse is equal to or more than a predetermined first count threshold.

5. The wireless power feeding system according to claim 1, wherein
   the power reception control unit is configured to increase the charging current in a case where the input voltage is equal to or larger than a third threshold which is larger than the first threshold.

6. The wireless power feeding system according to claim 5, wherein
   at least one of the first threshold or the third threshold is set according to a voltage value of a power storage unit to be charged by the power reception apparatus.

7. The wireless power feeding system according to claim 1, wherein
   the power transmission control unit is configured to receive a modulation signal from the power reception apparatus, and to increase the transmission power in a case where a charging current of the power reception apparatus is below a target value and where the input voltage is below the second threshold.

8. The wireless power feeding system according to claim 1, wherein
   the power transmission control unit includes a power transmission side timing adjustment unit configured to adjust timing to control the transmission power, and
   the power transmission side timing adjustment unit is configured to wait for a communication period to elapse after adjusting the transmission power, before performing the next adjustment of the transmission power.

9. The wireless power feeding system according to claim 8, wherein
the power transmission side timing adjustment unit includes a power transmission side counter configured to count a number of elapse of the communication period in a case where the modulation signal is not received, and the power transmission side timing adjustment unit is configured to reduce the transmission power in a case where the number of elapse is equal to or more than a predetermined second count threshold.

10. A power transmission apparatus for use in a wireless power feeding system including the power transmission apparatus configured to transmit predetermined transmission power and a power reception apparatus configured to receive input voltage according to the transmission power, wherein
the power transmission apparatus includes a power transmission control unit configured to control an amount of the transmission power,
the power transmission control unit is configured to receive a modulation signal from the power reception apparatus, and to reduce the transmission power in a case where the modulation signal is not received for a predetermined period after receiving the previous modulation signal,
the power transmission apparatus is configured to control the amount of the transmission power such that the input voltage is larger than a predetermined first threshold and below a second threshold which is larger than the first threshold,
the power transmission control unit includes a power transmission side timing adjustment unit configured to adjust timing to control the transmission power, and
the power transmission side timing adjustment unit is configured to wait for a communication period to elapse after adjusting the transmission power, before performing the next adjustment of the transmission power.

11. The power transmission apparatus according to claim 10, wherein
the power transmission side timing adjustment unit includes a power transmission side counter configured to count a number of elapse of the communication period in a case where the modulation signal is not received, and the power transmission side timing adjustment unit is configured to reduce the transmission power in a case where the number of elapse is equal to or more than a predetermined second count threshold.

12. A method for controlling a wireless power feeding system, comprising:
transmitting predetermined transmission power from a power transmission apparatus;
receiving input voltage according to the transmission power at a power reception apparatus;
controlling, by the power transmission apparatus, an amount of the transmission power;
receiving, by a power transmission control unit, a modulation signal from the power reception apparatus, and reducing, by the power transmission control unit, the transmission power in a case where the modulation signal is not received for a predetermined period after receiving the previous modulation signal;
controlling, by the power transmission apparatus and the power reception apparatus, the input voltage to be larger than a predetermined first threshold and below a second threshold which is larger than the first threshold;
adjusting, by a power transmission side timing adjustment unit, timing to control the transmission power; and
waiting for a communication period to elapse after adjusting the transmission power, before performing the next adjustment of the transmission power by the power transmission side timing adjustment unit.

13. The method for controlling a wireless power feeding system according to claim 12, wherein
the power transmission side timing adjustment unit includes a power transmission side counter configured to count a number of elapse of the communication period in a ease where the modulation signal is not received, and the method comprises reducing, by the power transmission side timing adjustment unit, the transmission power in a case where the number of elapse is equal to or more than a predetermined second count threshold.

14. A non-transitory computer-readable storage medium having recorded thereon a program that causes a computer to perform a method for controlling a wireless power feeding system, the method comprising:
transmitting predetermined transmission power from a power transmission apparatus;
receiving input voltage according to the transmission power at a power reception apparatus;
controlling, by the power transmission apparatus, an amount of the transmission power;
receiving, by a power transmission control unit, a modulation signal from the power reception apparatus, and reducing, by the power transmission control unit, the transmission power in a case where the modulation signal is not received for a predetermined period after receiving the previous modulation signal;
controlling, by the power transmission apparatus and the power reception apparatus, the input voltage to be larger than a predetermined first threshold and below a second threshold which is larger than the first threshold;
adjusting, by a power transmission side timing adjustment unit, timing to control the transmission power; and
waiting for a communication period to elapse after adjusting the transmission power, before performing the next adjustment of the transmission power by the power transmission side timing adjustment unit.

15. The non-transitory computer-readable storage medium according to claim 14, wherein
the power transmission side timing adjustment unit includes a power transmission side counter configured to count a number of elapse of the communication period in a case where the modulation signal is not received, and the method for controlling the wireless power feeding system comprises reducing, by the power transmission side timing adjustment unit, the transmission power in a ease where the number of elapse is equal to or more than a predetermined second count threshold.

16. A wireless power feeding system comprising:
a power transmission apparatus configured to transmit predetermined transmission power; and
a power reception apparatus configured to receive the transmission power and generate input voltage according to the transmission power, wherein the power transmission apparatus includes a power transmission control unit configured to control an amount of the transmission power, the power transmission control unit is configured to receive a modulation signal from the power reception apparatus, and to reduce the transmission power in a case where the modulation signal is not received for a predetermined period after receiving the previous modulation signal, the power transmission apparatus and the power reception apparatus are configured to control the input voltage to be larger than a predetermined first threshold and below a second threshold which is larger than the first threshold, the power transmission control unit includes a power transmission side timing adjustment unit configured to adjust timing to control the transmission power, and the power transmission side timing adjustment unit is configured to wait for a communication period to elapse after adjusting the transmission power, before performing the next adjustment of the transmission power.

17. A wireless power feeding system comprising:
a power transmission apparatus configured to transmit predetermined transmission power; and
a power reception apparatus configured to receive the transmission power and generate an input voltage according to the transmission power, wherein the power transmission apparatus includes a power transmission control unit configured to control an amount of the transmission power, the power transmission control unit is configured to receive a modulation signal from the power reception apparatus, and to reduce the transmission power in a case where the modulation signal is not received for a predetermined period after receiving the previous modulation signal, the power transmission apparatus and the power reception apparatus are configured to control the input voltage to be larger than a predetermined first threshold and below a second threshold which is larger than the first threshold, the power reception apparatus includes:
 a charging unit configured to charge with a charging current according to the input voltage; and
 a power reception control unit configured to control an amount of the charging current, the power reception control unit is configured to increase the charging current in a case where the input voltage is equal to or larger than a third threshold which is larger than the first threshold, and at least one of the first threshold or the third threshold is varied according to a voltage value of a power storage unit to be charged by the power reception apparatus.

* * * * *